United States Patent [19]

Dinwiddie, Jr.

[11] 4,417,304

[45] Nov. 22, 1983

[54] SYNCHRONOUS CYCLE STEAL MECHANISM FOR TRANSFERRING DATA BETWEEN A PROCESSOR STORAGE UNIT AND A SEPARATE DATA HANDLING UNIT

[75] Inventor: John M. Dinwiddie, Jr., Loxahatchee, Fla.

[73] Assignee: International Business Machines Corporation, Armonk, N.Y.

[21] Appl. No.: 321,132

[22] Filed: Nov. 13, 1981

Related U.S. Application Data

[63] Continuation of Ser. No. 62,262, Jul. 30, 1979, abandoned.

[51] Int. Cl.³ .............................................. G06F 3/00
[52] U.S. Cl. .................................................. 364/200
[58] Field of Search ................................ 364/200, 900

[56] References Cited

U.S. PATENT DOCUMENTS

| | | | |
|---|---|---|---|
| 3,961,312 | 6/1976 | Bodner et al. | 364/200 |
| 3,972,023 | 7/1976 | Bonner et al. | 364/200 |
| 3,996,564 | 12/1976 | Kerrigan et al. | 364/200 |
| 4,038,642 | 7/1977 | Bouknecht et al. | 364/200 |
| 4,096,578 | 6/1978 | Malkemes | 364/900 |
| 4,128,876 | 12/1978 | Ames et al. | 364/200 |
| 4,131,944 | 12/1978 | Mager et al. | 364/200 |
| 4,181,934 | 1/1980 | Marenin | 364/200 |

OTHER PUBLICATIONS

Rothlisberger, H.: a paper entitled "A Standard Bus for Multiprocessor Architecture" appearing in a book entitled Microcomputer Architectures, North-Holland Publishing Company, 1977.
Adams, G. et al.: "Design Motivations for Multiple Processor Microcomputer Systems, Computer Design", Mar. 1978.
Associated Computer Consultants, "Unibus Micro--Channel UMC-Z80 Processor Board", Apr. 1978.
Kinnie et al., "Dual-Port RAM Hikes Throughput in I/O Controller Board", Electronics, pp. 107-112, 8/17/78.
Samuelson, "Intelligent Controller Increases Data Throughput, Reduces Host Overhead", Computer Design, pp. 120-126, Jul. 1979.
Motorola Semiconductor Products Inc., "MC6881/MC3449 Triple Bi-Directional Bus Switch".

Primary Examiner—James D. Thomas
Assistant Examiner—David Y. Eng
Attorney, Agent, or Firm—Richard E. Bee

[57] ABSTRACT

A cycle steal mechanism for enabling a host processor to initiate and control the cycle stealing of data to or from a storage unit located in an I/O controller which is connected to the I/O channel bus of the host processor. The I/O controller also includes a microprocessor and a direct memory access (DMA) unit either or both of which can be used to control the transfer of data between the I/O controller storage unit and the host processor. Typically, the DMA unit is used for cycle stealing data between the controller storage unit and the host processor. The cycle steal mechanism of the present invention enables the host processor to also initiate and control the cycle stealing of data to or from the controller storage unit without interrupting the program running in the controller microprocessor and without interrupting the cycle stealing operations of the DMA unit. This new cycle steal mechanism is the reverse of the normal situation where it is the microprocessor or DMA unit that is controlling the cycle stealing. Since the I/O controller accommodates both kinds of cycle stealing, the present invention can be said to provide a "2-way" cycle stealing capability. Not only can the I/O controller cycle steal data to or from the host processor main storage unit, but also the host processor can cycle steal data to or from the I/O controller storage unit. The cycle stealing by the host processor is transparent to both the microprocessor and the DMA unit in the I/O controller. This new cycle steal mechanism makes use of the microprocessor address set-up pulse (ALE) and the DMA unit address set-up pulse (ADSTB) to cause the cycle stealing of the data to or from the controller storage unit to occur during such address set-up time. These address set-up times are times when neither the microprocessor nor the DMA unit is actually moving data into or out of the storage unit in the I/O controller.

9 Claims, 27 Drawing Figures

FIG. 3
IMMEDIATE DEVICE CONTROL BLOCK (IDCB)
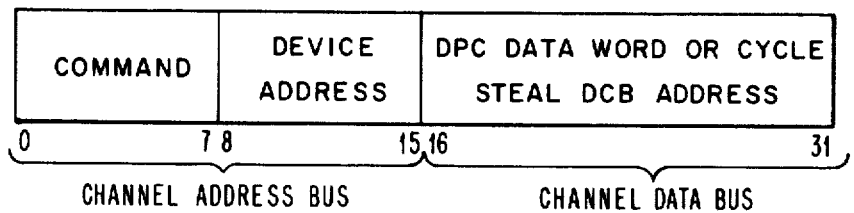
FIG. 5
CYCLE STEAL OPERATIONS
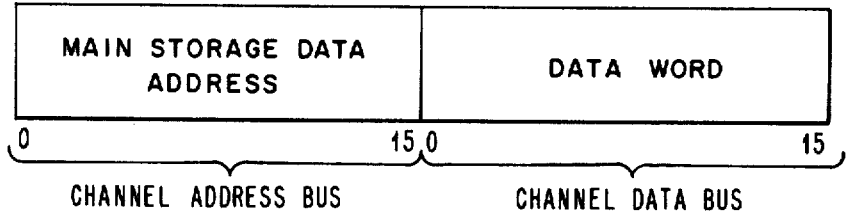
INTERRUPT ID WORD
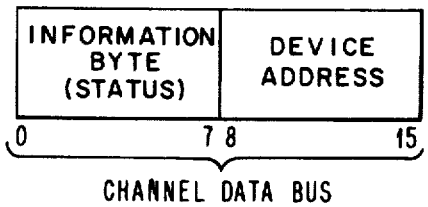
FIG. 6

FIG. 4

DEVICE CONTROL BLOCK (DCB)

| | |
|---|---|
| WORD 0 | CONTROL WORD |
| WORD 1 | DEVICE PARAMETER WORD ONE |
| WORD 2 | DEVICE PARAMETER WORD TWO |
| WORD 3 | DEVICE PARAMETER WORD THREE |
| WORD 4 | RESIDUAL STATUS BLOCK ADDRESS |
| WORD 5 | NEXT DCB ADDRESS |
| WORD 6 | BYTE COUNT |
| WORD 7 | MAIN STORAGE DATA ADDRESS |

FIG. 7

IMMEDIATE DEVICE CONTROL BLOCK (IDCB)

| COMMAND | DEVICE ADDRESS | IMMEDIATE | FIELD |
|---|---|---|---|
| 0 1 2 3 4    7 8 | 15 16 | 23 24 | 31 |
| | | BYTE 2 | BYTE 3 |

| CHAN | R/W | FUNCTION | MODIFIER | HEX | SPECIFIC COMMAND | TYPE OF OPERATION |
|---|---|---|---|---|---|---|
| 0 | 0 | 00 READ | XXXX | 0X | READ 0 | DPC |
| 0 | 0 | 01 READ | XXXX | 1X | READ 1 | DPC |
| 0 | 0 | 10 READ STATUS | XXXX | 2X | READ STATUS | DPC |
| 0 | 0 | 11 | | 3X | UNUSED | UNUSED |
| 0 | 1 | 00 WRITE | XXXX | 4X | WRITE 0 | DPC |
| 0 | 1 | 01 WRITE | XXXX | 5X | WRITE 1 | DPC |
| 0 | 1 | 10 CONTROL | XXXX | 6X | CONTROL | DPC |
| 0 | 1 | 11 START | XXXX | 7X | START CYCLE STEAL | CYCLE STEAL |
| 0 | 1 | 11 START | 1111 | 7F | START CYCLE STEAL STATUS | CYCLE STEAL |
| 1 | 1 | 11 CHANNEL | 0000 | F0 | HALT I/O | CHANNEL |

INTERUPT AND CYCLE STEAL HANDSHAKING

FIG. 15

| HOST ADDRESS BITS | | | | | STORAGE MAP FOR IDCB BYTES 2&3 | |
|---|---|---|---|---|---|---|
| 14 | 15 | 1 | 2 | 3 | | |
| 1 | 1 | 1 | 1 | 1 | DEVICE D START | 31 |
| 1 | 1 | 1 | 1 | 0 | DEVICE D CONTROL | |
| 1 | 1 | 1 | 0 | 1 | DEVICE D WRITE 1 | |
| 1 | 1 | 1 | 0 | 0 | DEVICE D WRITE 0 | |
| 1 | 1 | 0 | 1 | 1 | NOT USED | |
| 1 | 1 | 0 | 1 | 0 | DEVICE D READ STATUS | |
| 1 | 1 | 0 | 0 | 1 | DEVICE D READ 1 | |
| 1 | 1 | 0 | 0 | 0 | DEVICE D READ 0 | |
| 1 | 0 | 1 | 1 | 1 | DEVICE C START | |
| 1 | 0 | 1 | 1 | 0 | DEVICE C CONTROL | |
| 1 | 0 | 1 | 0 | 1 | DEVICE C WRITE 1 | |
| 1 | 0 | 1 | 0 | 0 | DEVICE C WRITE 0 | |
| 1 | 0 | 0 | 1 | 1 | NOT USED | |
| 1 | 0 | 0 | 1 | 0 | DEVICE C READ STATUS | |
| 1 | 0 | 0 | 0 | 1 | DEVICE C READ 1 | |
| 1 | 0 | 0 | 0 | 0 | DEVICE C READ 0 | |
| 0 | 1 | 1 | 1 | 1 | DEVICE B START | |
| 0 | 1 | 1 | 1 | 0 | DEVICE B CONTROL | |
| 0 | 1 | 1 | 0 | 1 | DEVICE B WRITE 1 | |
| 0 | 1 | 1 | 0 | 0 | DEVICE B WRITE 0 | |
| 0 | 1 | 0 | 1 | 1 | NOT USED | |
| 0 | 1 | 0 | 1 | 0 | DEVICE B READ STATUS | |
| 0 | 1 | 0 | 0 | 1 | DEVICE B READ 1 | |
| 0 | 1 | 0 | 0 | 0 | DEVICE B READ 0 | |
| 0 | 0 | 1 | 1 | 1 | DEVICE A START | |
| 0 | 0 | 1 | 1 | 0 | DEVICE A CONTROL | |
| 0 | 0 | 1 | 0 | 1 | DEVICE A WRITE 1 | |
| 0 | 0 | 1 | 0 | 0 | DEVICE A WRITE 0 | |
| 0 | 0 | 0 | 1 | 1 | NOT USED | |
| 0 | 0 | 0 | 1 | 0 | DEVICE A READ STATUS | |
| 0 | 0 | 0 | 0 | 1 | DEVICE A READ 1 | |
| 0 | 0 | 0 | 0 | 0 | DEVICE A READ 0 | 0 |

DEVICE ADDRESS BITS — COMMAND BITS

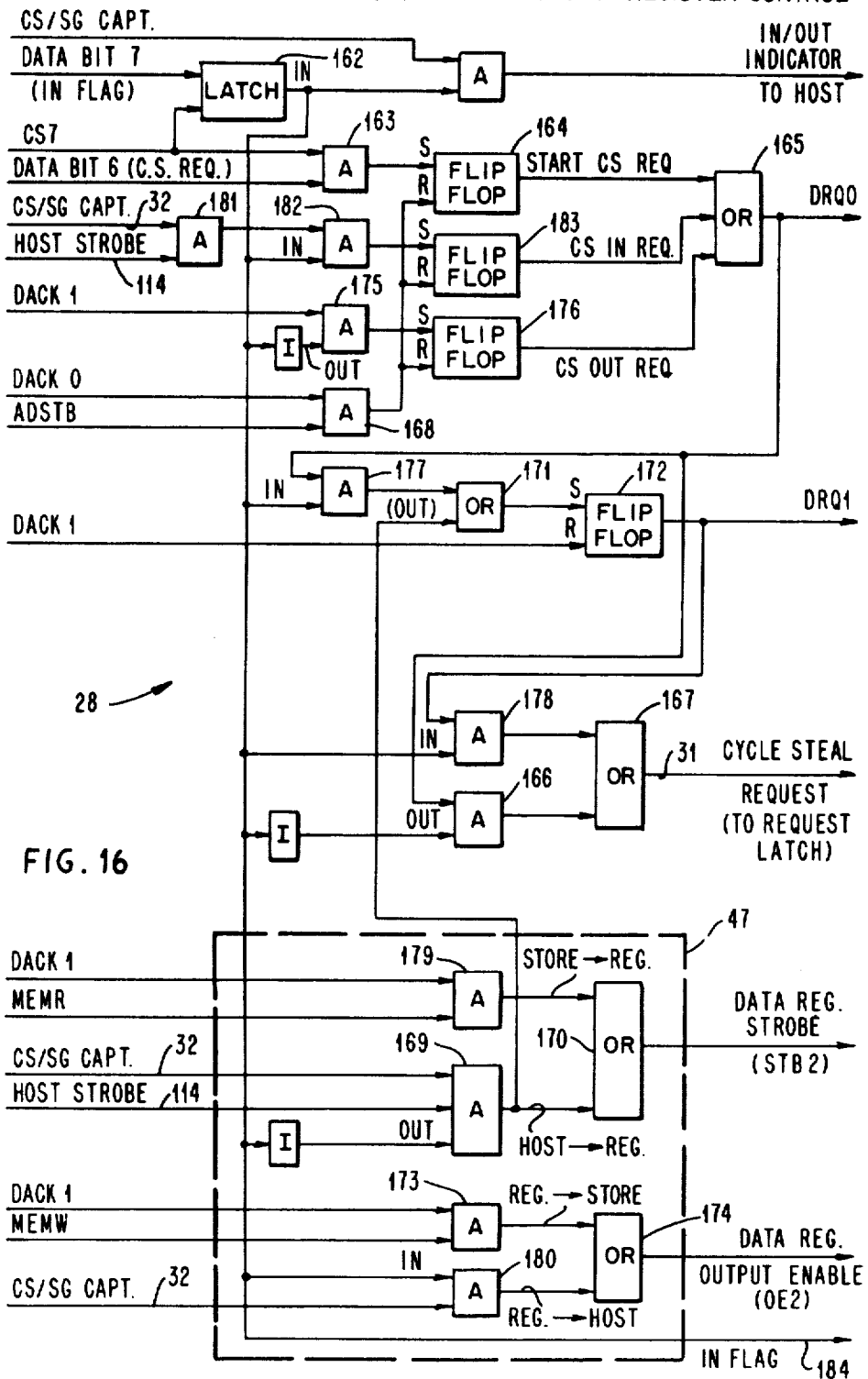
FIG. 16 HOST DMA REQUEST LOGIC AND DATA REGISTER CONTROL

SYNCHRONOUS CYCLE STEAL MECHANISM FOR TRANSFERRING DATA BETWEEN A PROCESSOR STORAGE UNIT AND A SEPARATE DATA HANDLING UNIT

CROSS-REFERENCE TO RELATED APPLICATIONS

This application is a continuation of application Ser. No. 062,262, filed July 30, 1979 and now abandoned.

The present patent application is one of three copending patent applications which describe the same overall machine configuration but which individually claim different inventive concepts embodied in such overall machine configuration. The other two related patent applications are more particularly described as follows:

(1) Application Ser. No. 062,263, filed July 30, 1979, entitled "I/O Controller For Transferring Data Between A Host Processor and Multiple I/O Units", the inventors being Messrs. J. M. Dinwiddie, Jr., et al., which application was abandoned and replaced by continuation application Ser. No. 325,151, filed Nov. 25, 1981, now U.S. Pat. No. 4,371,932, issued Feb. 1, 1983; and (2) Application Ser. No. 062,261, filed July 30, 1979, entitled "A Data Interface Mechanism For Interfacing Bit-Parallel Data Buses Of Different Bit Width", the inventor being J. M. Dinwiddie, Jr., now U.S. Pat. No. 4,309,754, issued Jan. 5, 1982.

All three of these copending patent applications are assigned to International Business Machines Corporation of Armonk, N.Y.

BACKGROUND OF THE INVENTION

This invention relates to cycle steal mechanisms for use in digital data processing systems for transferring data between a processor storage unit and a separate data handling unit. Though not limited thereto, the invention is particularly useful for cycle stealing data into or out of a microprocessor storage unit.

A data processing technique, which is frequently used, is known as "direct memory accessing". This enables an I/O unit to access the main storage unit of a host processor without requiring the attention of the host processor. Another technique that is in current usage is known as "cycle stealing". This is a technique used in some host processors for carrying out direct memory access operations. When a direct memory access request is received by the host processor from an I/O unit, one host processor clock cycle is "stolen" at the end of the "execute" portion of the current instruction. Typically, the entire data transfer to or from the host processor main storage unit takes place during the stolen host processor clock interval.

In various applications, it would be desirable to have a cycle stealing mechanism which did not have to wait until completion of the current instruction before gaining access to the storage unit. In particular, it would be desirable to be able to cycle steal the data to or from the storage unit during any of the various machine cycles which are involved in the fetching and execution of an instruction.

In general, the cycle stealing mechanisms heretofore proposed have been for enabling an I/O unit to cycle steal data into or out of a host processor main storage unit. In many present day applications, the I/O unit is coupled to the host processor by means of an I/O controller. Such I/O controller typically includes a microprocessor for supervising the data transfer activities. In such applications, it would frequently be desirable to have a reverse kind of cycle stealing mechanism for enabling the host processor to cycle steal data to or from the microprocessor storage unit located in the I/O controller. In such case, the host processor could cycle steal data into or out of the I/O controller storage unit at the same time that the I/O controller is busy cycle stealing a different set of data into or out of the host processor main storage unit. It would also be desirable to be able to do this reverse type of cycle stealing in a manner which is transparent to the microprocessor in the I/O controller.

There is described herein a new and improved cycle stealing mechanism which can be used to achieve one or more of the foregoing desirable objectives. While of general applicability, the invention is illustrated by means of an embodiment wherein the cycle stealing mechanism is used to enable a host processor to transfer data to or from a microprocessor storage unit located in an I/O controller is a manner which is transparent to the microprocessor.

For a better understanding of the present invention, together with other and further advantages and features thereof, reference is made to the following description taken in connection with the accompanying drawings, the scope of the invention being pointed out in the appended claims.

BRIEF DESCRIPTION OF THE DRAWINGS

Referring to the drawings:

FIGS. 3-7 show various command, control block and status word formats and the like used in the FIG. 1 data processing system;

FIG. 15 is an enlargement of a portion of the FIG. 14 address range map, the part shown in FIG. 15 being applicable to the two IDCB address range segments shown in FIG. 14;

FIG. 16 shows in greater detail the internal construction of the host DMA request logic of FIG. 2B and also the logic for developing the strobe and output enable control signals for the data register of FIG. 2A;

DESCRIPTION OF OVERALL SYSTEM

Unless otherwise indicated by the context, the term "data" is used herein in its broadest sense as including any kind of information such as alphanumeric data, status information, control information, address values and the like.

Figure 1:
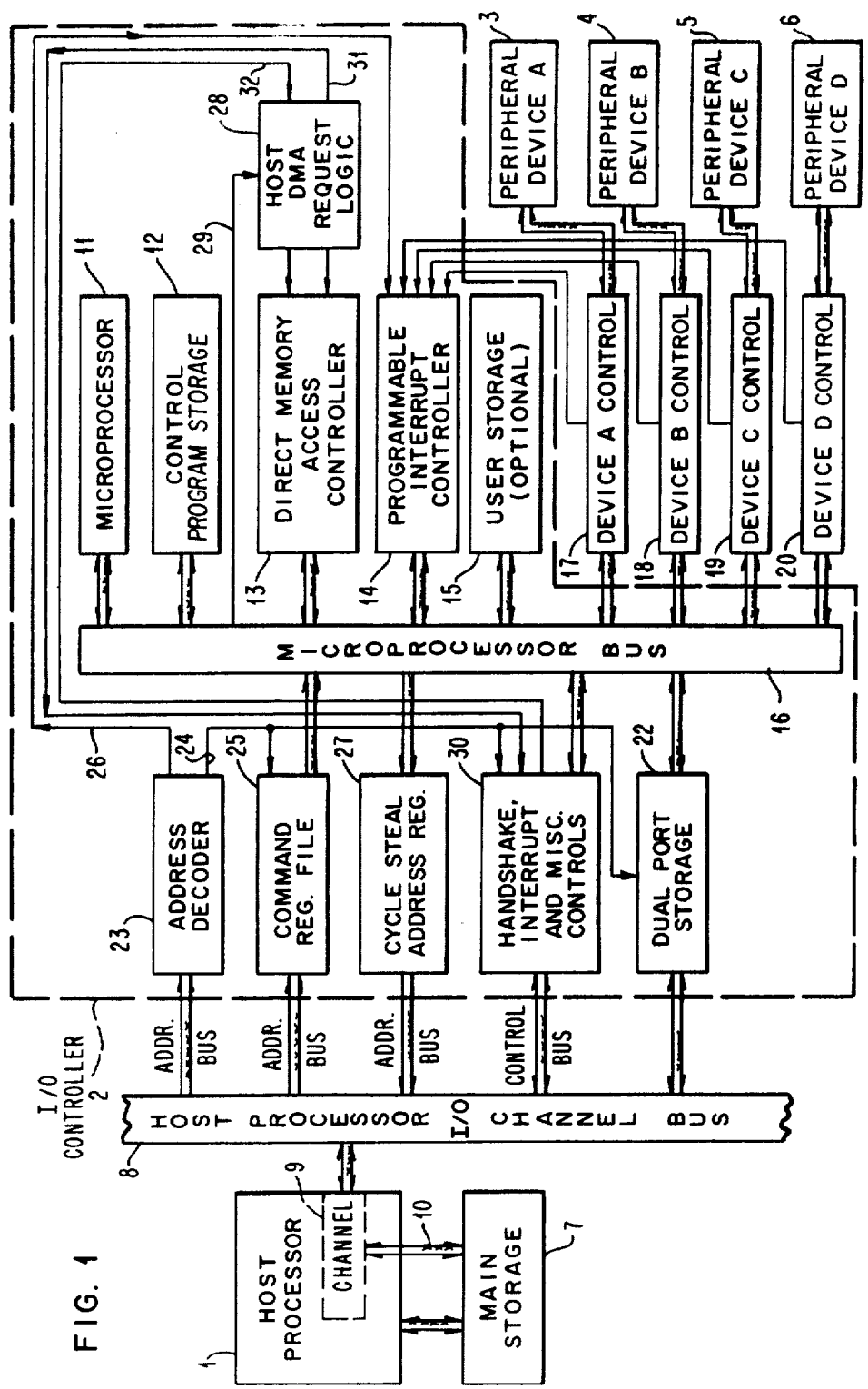
FIG. 1 is a schematic block diagram of a digital data processing system showing the incorporation therein of an I/O controller constructed in accordance with the present invention.

Referring to FIG. 1, there is shown a block diagram of a digital data processing system which includes an input/output (I/O) controller constructed in accordance with the present invention. The system includes a host processor 1, an I/O controller 2 and a plurality of I/O units 3–6. Coupled to the host processor 1 is a host processor main storage unit 7. The host processor 1 is constructed to communicate with various I/O controllers and I/O units by means of a host processor I/O channel bus 8. This channel bus 8 is connected to and driven by a channel portion 9 of the host processor 1. Channel portion 9 is also directly connected to the main storage unit 7 by way of a storage bus 10. This channel storage bus 10 enables the cycle stealing of data between the channel bus 8 and the main storage unit 7 without interrupting the program being executed in the host processor 1.

For sake of example herein, the host processor 1 is assumed to be an IBM Series/1 processor, several models of which are currently being manufactured and sold by the International Business Machines Corporation of Armonk, N.Y. Thus, the channel bus 8 is assumed to be a Series/1 channel bus and, as such, the construction and operation thereof is described in considerable detail in U.S. Pat. No. 4,038,642, entitled "Input/Output Interface Logic For Concurrent Operations" and issued on July 26, 1977, to Messrs. Bouknecht et al. This Bouknecht et al patent also describes an existing Series/1 type of I/O controller and its manner of use in connecting I/O units to the host processor channel bus 8.

The I/O controller 2 is a representative embodiment of a new and improved I/O controller constructed in accordance with the teachings of the present invention. It provides various advantages and improvements over and above those which are provided by the existing and currently marketed Series/1 I/O controllers. Furthermore, these new and improved features are of general applicability and should not be considered as being limited to usage in a Series/1 type of I/O controller.

The new and improved I/O controller 2 is a microprocessor based I/O controller and includes a microprocessor 11, a control program storage unit 12, a direct memory access (DMA) controller unit 13, a programmable interrupt controller (PIC) unit 14 and, optionally, a user storage unit 15. Typically, each of these units 11–15 is comprised of one or more integrated circuit chips and each of these units 11–15 is coupled to a microprocessor I/O bus 16 which is of the proper construction as required by the microprocessor 11. The I/O units 3–6 are also coupled to the microprocessor I/O bus 16 by way of their respective ones of device control units 17–20.

For sake of example herein, the microprocessor 11 is assumed to be an Intel 8085A microprocessor. This is a single chip 8-bit microprocessor which is currently manufactured and marketed by the Intel Corporation of Santa Clara, Calif. The control program storage unit 12 is assumed to be a read only storage unit and is constructed to contain the various operating instructions and operating routines which are used by the microprocessor 11 in supervising and controlling the data transfer activities in the I/O controller 2. The microprocessor bus 16 is assumed to be the customary 8085A microprocessor bus. For sake of example, the direct memory access controller 13 is assumed to be an Intel 8257 programmable DMA controller. This is a single chip four-channel DMA controller and is currently manufactured and marketed by the Intel Corporation of Santa Clara, Calif. For sake of example, the programmable interrupt controller (PIC) unit 14 is assumed to be an Intel 8259 programmable interrupt controller. It is a single chip eight-request interrupt controller and is currently manufactured and marketed by Intel Corporation of Santa Clara, Calif.

A primary feature of the new and improved I/O controller 2 is the use of a dual port random access storage mechanism 22 to provide the data transfer interface between the microprocessor bus 16 and the host processor channel bus 8. One port of this storage mechanism 22 is coupled to the host processor channel bus 8 and the other port is coupled to the microprocessor bus 16. Data passing from the channel bus 8 to the microprocessor bus 16 or vice versa is at least temporarily stored in this storage mechanism 22.

The construction of the I/O controller 2 is such that the microprocessor 11 thinks that this dual port storage unit 22 is its own private random access storage unit. In particular, the storage unit 22 is coupled to the microprocessor 11 in generally the same manner as any other random access storage unit is normally coupled to a microprocessor. Thus, microprocessor 11 can transfer data into or out of the storage unit 22 in its normal manner. Nevertheless, the dual port storage unit 22 can be accessed directly by the host processor 1 and the host processor 1 can transfer data to or from the storage unit 22 during such access. The construction is, however, such that this direct accessing by the host processor 1 is transparent to the microprocessor 11. Thus, the dual port storage mechanism 22 is operated in the manner of a shared storage unit which is shared by both the microprocessor 11 and the host processor 1, with the host processor accesses being transparent to the microprocessor 11.

The host processor 1 can cause the initiation or termination of I/O operations in the I/O controller 2 by sending thereto via channel bus 8 immediate device control blocks (IDCB's) which include a one-byte I/O command and a one-byte device address. In the present embodiment, these two items, the I/O command and the device address, are sent out over the address bus portion of the channel bus 8. Each of the I/O units 3–6 is assigned its own unique device address. An address decoder 23 monitors the channel bus 8. When it detects the occurrence of the unique address address for one of the I/O units 3-6, it generates an address gate capture signal on its output line 24. This signal is supplied to a four-byte command register file 25 to cause the storage therein of the one-byte I/O command then appearing on the channel bus 8. The address decoder 23 also activates the appropriate one of the device select lines in a four-bit device select bus 26, these four device select lines running to four different interrupt request inputs of the programmable interrupt controller 14. In due course, the interrupt controller 14 sends an interrupt request for the selected I/O unit to the microprocessor 11 via the microprocessor bus 16. In due course, the microprocessor 11 recognizes this interrupt request and fetches the corresponding I/O command from the register file 25. In due course, the microprocessor 11 initiates whatever action is called for by this I/O command.

This host processor I/O command mode is also used for transferring data between the host processor 1 and the dual port storage unit 22. More particularly, during the occurrence of the I/O command and device address on the channel bus 8, a word (two-bytes) of data can also be placed on the data bus portion of the channel bus 8 by either the host processor 1 or the dual port storage unit 22. For the case of a write type I/O command, the host processor 1 places the data word on the channel bus, after which such data word can be written into the dual port storage 22. Conversely, for the case of a read type I/O command, the dual port storage 22 places a data word on the channel bus 8 and such data word is read into the host processor 1. In either case, the addressing of the dual port storage 22 is accomplished by some of the I/O command and device address bits appearing on the address bus portion of the channel bus 8. In other words, the host processor 1 supplies the address bit values which are used to address the dual port storage 22. The construction of the I/O controller 2 is such that this accessing of the dual port storage 22 does not interrupt the program being executed by the microprocessor 11 and, hence, this host processor accessing is transparent to the microprocessor 11.

A second and different mode of data transfer between the host processor 1 and the I/O controller 2, or, more particularly, the controller dual port storage unit 22, is also provided. This second mode is a so-called cycle steal data transfer mode with the individual data word transfers being initiated and controlled by the I/O controller 2 and with the data words being cycle stole into or out of the host processor main storage unit 7. Normally, this cycle steal mode is used for transferring a multi-word block of data between the host processor 1 and the controller storage unit 22. In the present embodiment, these cycle steal data transfers are supervised and controlled by the direct memory access controller 13. As such, for each data word transfer, the DMA controller 13 supplies a first address to the host processor 1 by way of a cycle steal address register 27 and a second address to the dual port storage unit 22 by way of the microprocessor bus 16. The address supplied to the host processor 1 selects the location in main storage 7 to (or from) which the data is to be transferred and the address supplied to the dual port storage 22 selects the location in the storage 22 from (or to) which the data is to be transferred. The data word is moved into or out of the host processor main storage unit 7 in a cycle steal mode (via storage bus 10), which means that such data transfer does not cause an interruption of the program being executed by the host processor 1. This cycle steal data transfer mode requires the use of two channels in the DMA controller 13, one for supplying the host processor main storage addresses to the cycle steal address register 27 and the other for supplying the controller storage addresses to the storage unit 22. The DMA controller 3 also includes a word counter for keeping track of how many words in a multi-word block of data remain to be transferred.

Operation of the DMA controller 13 is controlled by host DMA request logic 28. For any given multi-word cycle steal transfer operation, the address counters and the word counter in the DMA controller 13 are initially loaded to the proper starting values by the microprocessor 11. Then the microprocessor 11 issues appropriate "start" signals to the request logic 28 via lines 29. Thereafter, the DMA controller 13 and the request logic 28 take over to handle the cycle stealing of the multi-word block of data. For each word transfer, the request logic 28 sends to a handshake, interrupt and miscellaneous controls unit 30 a cycle steal request signal via line 31. In response thereto, the controls unit 30 sends a cycle steal request signal to the host processor 1. When the host processor channel portion 9 is ready to do the data word transfer, it sends back a service gate signal to the control unit 30 which, in response thereto, produces a service gate capture signal which is supplied via line 32 to the request logic 28. This signal is used to coordinate the operation of the DMA controller 13 with the operation of the host processor channel portion 9. The handshake, interrupt and miscellaneous controls 30 are generally similar to those described in the above-cited U.S. Pat. No. 4,038,642 to Bouknecht et al and, hence, will not be described in detail herein.

As will be seen, the I/O controller 2 includes circuitry for interleaving the host processor I/O command type data transfers with the individual data word cycle steal transfers provided by the DMA controller 13. Thus, two different modes of data transfer are provided between the host processor 1 and the I/O controller 2, with the individual transfers for the two modes being interleaved to provide a minimum of delay and a minimum of interference with one another.

A third mode of data transfer remains to be considered, namely, the mode or manner of transferring data between the dual port storage unit 22 and the I/O units or I/O devices 3-6. In the present embodiment, the microprocessor 11 is used to handle and control this transfer of data between the storage unit 22 and the I/O devices 3-6. For the case of a storage unit to device transfer, a first microprocessor instruction cycle is used to address the storage unit 22 and to transfer a byte of data from the storage unit 22 to an internal register in the microprocessor 11. A second microprocessor instruction cycle is then used to address the desired I/O device and to move the data byte from the microprocessor internal register to the selected I/O device. When transferring data in the opposite direction, this sequence is performed in reverse, namely, the microprocessor 11 fetches a byte of data from a particular I/O device and then, during its next instruction cycle, writes such byte of data into the storage unit 22.

The device control units 17-20 for the respective I/O devices 3-6 inform the microprocessor 11 as to when they are ready to send to or receive from the storage unit 22 a byte of data. This informing action is accomplished by way of interrupt request signals which are sent to the programmable interrupt controller 14. For each such interrupt request, the programmable interrupt controller, in turn, sends an interrupt request to the microprocessor 11 by way of the microprocessor bus 16. The programmable interrupt controller 14 includes a priority resolver which operates when plural requests are received to determine the order in which these requests are passed on to the microprocessor 11.

In addition to performing its I/O data transfer activities, the microprocessor 11 can also be used to offload some of the programming functions normally performed in the host processor 1. The microprocessor 11 can, for example, do some of the routine and reoccuring numerical calculations normally done in the host processor 1. There are several ways of doing this. A typical way would be to have the host processor 1 transfer the appropriate number crunching program routine into the dual port storage unit 22. The routine transferred to the dual port storage 22 would include all of the instructions needed by the microprocessor 11 for subsequently receiving from the host processor 1 the numbers to be crunched, doing the number crunching and thereafter transferring the results back to the host processor 1. After the program routine has been transferred, then whenever the host processor 1 has a set of the numbers to be crunched, it advises the microprocessor 11 of this fact (via a particular I/O command) and sends the numbers over to the dual port storage unit 22. Thereafter, as time permits, the microprocessor 11 does the number crunching under the control of the number crunching program instructions previously stored in the dual port storage unit 22. After completion of the number crunching, microprocessor 11 causes the results to be sent back to the host processor 1. Typically, the number crunching program, the numbers to be crunched and the results, will be transferred between the host processor 1 and the dual port storage unit 22 by means of the host processor cycle stealing mode which is controlled by the DMA controller 13.

An interesting aspect of the host processor offloading capability of the I/O controller 2 is that the particular host processor functions offloaded to the I/O controller 2 can be changed from time to time, if desired. Thus, for example, during a first interval of time a first type of number crunching operation could be offloaded to the I/O controller 2 and later, during a second interval of time, a second and different type of number crunching function could be offloaded to the I/O controller 2 to replace the first number crunching function. Thus, where desired, the mission of the I/O controller 2 can be changed from time to time by the host processor 1.

Description of the I/O Controller Embodiment of FIG. 2

Figure 2C:
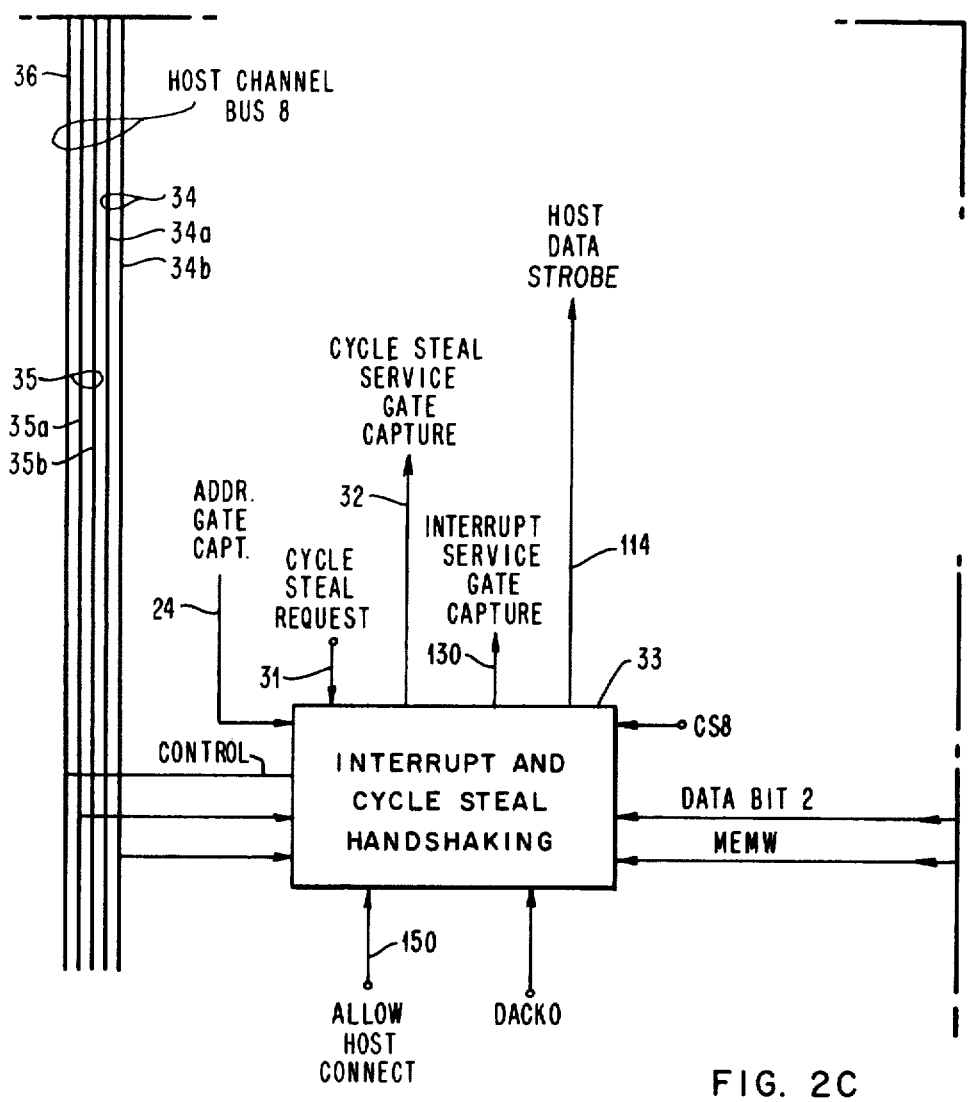
FIGS. 2A, 2B, 2C and 2D, when placed side-by-side in the manner indicated in FIG. 2, form a single figure which shows in greater detail the construction of the novel I/O controller of FIG. 1.
Figure 2A:
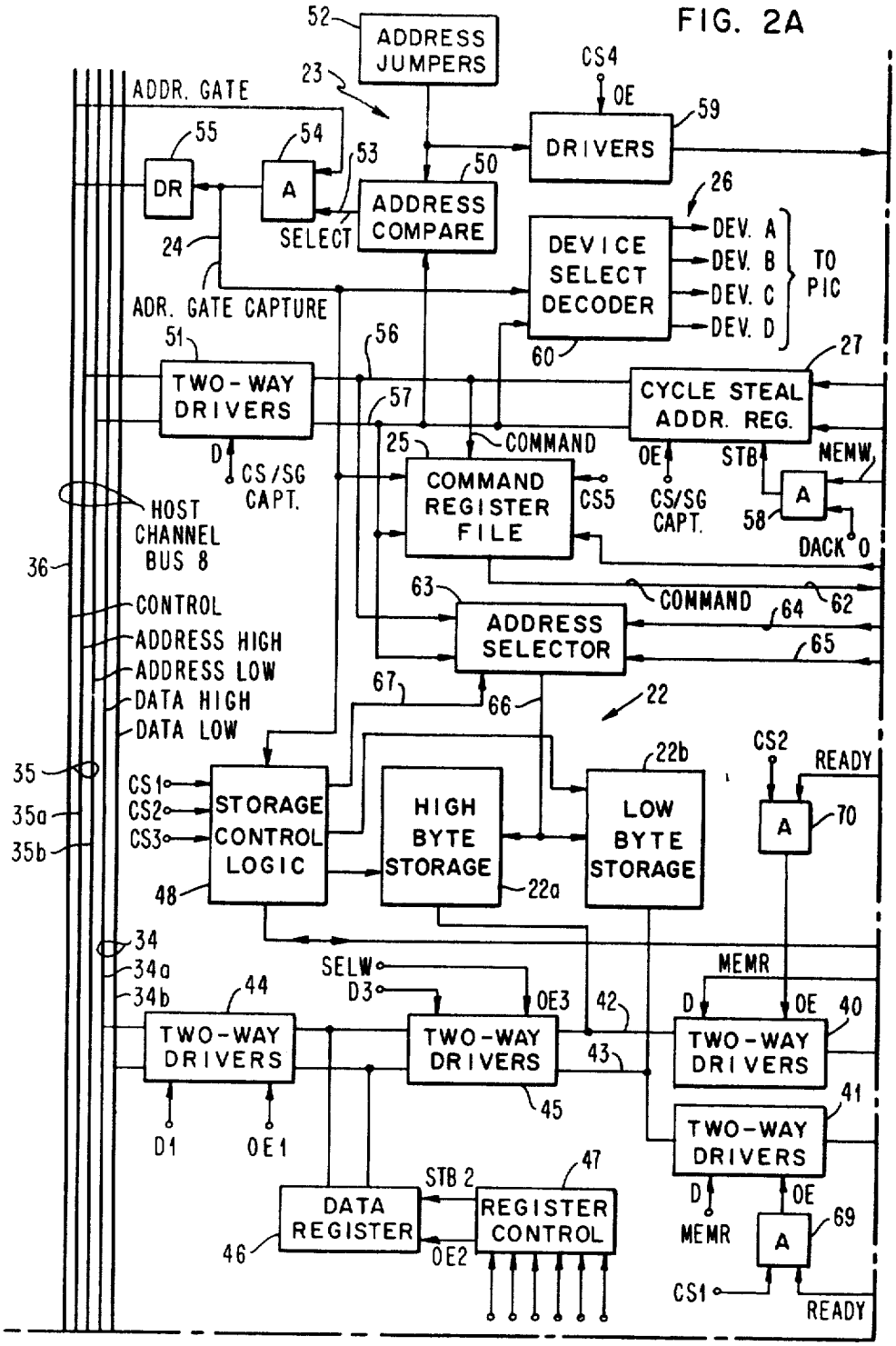

Referring now to FIGS. 2A, 2B, 2C and 2D, there is shown in greater detail the construction of the I/O controller 2 of FIG. 1. FIG. 2A should be placed on the left side of FIG. 2B, FIG. 2C should be placed below FIG. 2A and FIG. 2D should be placed below FIG. 2B to form a single figure which will be referred to herein as FIG. 2. A minor drawing difference to be noted is that a unit 33 shown in FIG. 2C is intended to include some, but not all, of the functions covered by the handshake, interrupt and miscellaneous controls unit 30 of FIG. 1. More particularly, the unit 33 of FIG. 2C includes only the interrupt and cycle steal handshaking functions of the controls unit 30 of FIG. 1.

For the present embodiment, a "word" is assumed to be composed of two bytes and a "byte" is assumed to be composed of eight bits.

With reference to FIGS. 2A-2D, the host processor channel bus 8 is comprised of a two-byte data bus 34, a two-byte address bus 35 and a multi-line control bus 36. The two-byte (or one word) data bus 34 includes 16 parallel data bit lines which are subgrouped into a first 8-bit data bus 34a for the high order byte of the 2-byte host processor data word and a second 8-bit data bus 34b for the low order byte of the 2-byte data word. In a similar manner, the address bus 35 is composed of 16 parallel address bit lines which are subgrouped into an 8-bit address bus 35a for the higher order address bits and an 8-bit address bus 35b for the lower order address bits. The control bus 36 is comprised of approximately 45 parallel control lines and these control lines and their functions are discussed in greater detail in the above-cited U.S. Pat. No. 4,038,642 to Bouknecht et al.

The microprocessor I/O bus 16, on the other hand, is comprised of a 1-byte data bus 37, a 2-byte address bus 38 and a multi-line control bus 39. The data bus 37 has 8 parallel data bit lines. The address bus 38 has 16 parallel address bit lines and these are subgrouped into a first 8-bit address bus 38a for the higher order address bits and a second 8-bit address bus 38b for the lower order address bits. The control bus 39 includes somewhere on the order of 25 parallel control signal lines, corresponding approximately to the number of control terminals of the microprocessor 11 plus a few additional lines for the control terminals for some of the other units which do not match up with or complement the microprocessor control terminals. These control lines are described in greater detail in the various Users' Manuals and other technical literature published by the Intel Corporation and relating to the Intel 8085A microprocessor.

As shown in FIG. 2A, the dual port storage unit 22 is actually comprised of a number of separate random access storage units, the number of such storage units being equal to the ratio of M to N, where M denotes the width of the host processor data bus 34, and N denotes the width of the microprocessor data bus 37, with M being a multiple of N. In the present embodiment, M is equal to two bytes and N is equal to one byte, giving a ratio of M to N of 2. Thus, in the present embodiment, the dual port storage mechanism 22 is composed of two separate random access storage units 22a and 22b, each having a width of one byte. The storage unit 22a is used for storing the high order bytes of the various two-byte data words and thus is coupled to the high byte data bus 34a of the host processor channel bus 8. Storage unit 22b is used for storing the low order bytes of the various two-byte data words and, as such, is coupled to the low byte data bus 34b of the host processor channel bus 8.

The high byte and low byte storage units 22a and 22b are part of a novel data interface mechanism for interfacing an M-byte data bus with an N-byte data bus for the particular case where M is equal to two and N is equal to one. Thus, for the more general case, the number of such separate storage units is made equal to the ratio of M to N. Thus, for example, for the case of a host processor having a 4-byte channel data bus and a microprocessor having a 1-byte data bus, four such separate storage units would be used. Also, in the more general case, the width of each such storage unit should be equal to N, the width of the narrower of the two data buses.

As indicated in FIG. 2A, the I/O controller 2 also includes a separate and different selectively operable N-byte data transfer mechanism for each of the different storage units 22a and 22B. In the present embodiment, these data transfer mechanisms take the form of one-byte two-way drivers 40 and 41. For sake of example, each of these drivers 40 and 41 is assumed to be an Intel 8286 8-bit parallel bidirectional bus driver. One side of the 8-bit drivers 40 is coupled by way of an 8-bit storage bus 42 to the data terminals of the high byte storage unit 22a and the other side or set of I/O terminals of the drivers 40 are coupled to the 8-bit microprocessor data bus 37. In a corresponding manner, one side of the 8-bit drivers 41 is coupled by way of an 8-bit storage bus 43 to the data terminals of the low byte storage unit 22b and the other side of drivers 41 is coupled to the 8-bit microprocessor data bus 37.

Each of the drivers 40 and 41 has two control terminals, namely, a direction control terminal D and an output enable control terminal OE. When the direction control terminal D is at the zero level, data can flow from right to left and, when D is at the one level, data can flow in the opposite direction, namely, from left to right. When the output enable terminal OE is at the zero level, all output lines of the drivers are set to a high impedance output state and the drivers are disabled so that no data can pass therethrough. When the OE terminal is set to the one level, the drivers are enabled and are in a condition to pass data in the direction determined by the binary level at the direction control terminal D.

As will be seen, these drivers 40 and 41 are rendered operative, that is, enabled, only when data is being transferred between the storage units 22a and 22b and the microprocessor data bus 37. Also, they are enabled in an alternating manner for transferring successive data bytes between the microprocessor data bus 37 and alternate ones of the storage units 22a and 22b. In other words, for a first data byte, drivers 40 are turned on and drivers 41 are turned off to enable this data byte to be transferred to or from the high byte storage unit 22a. Then, for the next data byte, drivers 41 are turned on and drivers 40 are turned off to enable the data byte to be transferred to or from the low byte storage unit 22b. In this manner, only one byte at a time is transferred to or from the one-byte microprocessor data bus 37.

The I/O controller 2 further includes a selectively operable M-byte data transfer mechanism for coupling the data terminals of the different storage units 22a and 22b to different N-byte subgroups of the M-byte host processor channel data bus. In the present embodiment, M is two and N is one so that the data terminals of the different storage units 22a and 22b are coupled to the respective ones of the one-byte subgroups 34a and 34b of the 2-byte channel data bus 34. This data transfer mechanism includes 16-bit two-way drivers 44, 16-bit two-way drivers 45, a 16-bit or 2-byte data register 46 and a register control unit 47. For sake of example, each of the drivers 44 and 45 is assumed to be comprised of two Intel 8286 8-bit parallel bidirectional drivers. For simplicity of illustration, each set of two 8-bit driver units is represented by a single block in FIG. 2a. The connections are such that the high byte storage unit 22a is connected to the high byte data bus 34a and the low byte storage unit 22b is connected to the low byte data bus 34b.

These drivers 44 and 45 also have direction control terminals D and output enable control terminals OE. In this case, however, the orientation of the drivers 44 and 45 is such that when the direction control terminal D is at the zero level, the data flow direction is from left to right, that is, from the channel data bus 34 to the storage units 22a and 22b. For the moment, it is assumed that these direction and output enable control signals are obtained from a storage control logic unit 48 and, in fact, their manner of generation will be explained hereinafter in connection with the details of the storage control logic 48.

For sake of example, the data register 46 is assumed to be a pair of Intel 8282 8-bit input/output port units. Each such unit includes eight bipolar latches, each having a three-state output buffer. A strobe signal STB is used to load the latches and an output enable signal OE is used to enable the output buffers. When not enabled, these latch output buffers present a high output impedance to the register output terminals. In the present embodiment, the input terminals of the data register 46 are coupled to the same data lines as are the output terminals of the data register 46. Thus, each individual bit input terminal is, in effect, connected to its corresponding individual bit output terminal. As will be seen, there may be occasions when both the strobe and output enable control signals are at the one level at the same time. This means that the latch output buffers will be enabled at the same time that the latches are being loaded. This is a permissible condition and will not cause injury to either the latches or the output buffers.

As will be seen, the two-way drivers 45 are never enabled at the same time that one or the other of the one-byte drivers 40 and 41 are enabled. Thus, the data terminals of the storage units 22a and 22b can be connected to one or the other of the channel data bus 34 and the microprocessor data bus 37, but never to both at the same time. As is apparent, the two-way drivers 45 serve to transfer data to or from both of the storage units 22a and 22b in a simultaneous manner. This is in contrast to the alternate byte-by-byte transfers provided by the one-byte drivers 40 and 41.

The purpose of the data register 46 is to temporarily store a 2-byte data word for those cases where the host processor 1 is not ready to accept the data word at the same moment that the I/O controller is wanting to transmit the data word and vice versa. For example, the I/O controller 2 can read a data word out of the storage units 22a and 22b and, if the host processor 1 is not quite ready to receive it, then such data word is temporarily held in the data register 46. Thereafter, when the host processor 1 becomes ready, the two-way drivers 44 are enabled to place the data word being held in the data register 46 onto the host processor data bus 34. If, on the other hand, the host processor 1 were ready at the same time as the I/O controller 2, then both the two-way drivers 44 and the two-way drivers 45 would be enabled at the same time so that the data word could be passed straight through to the host processor data bus 34. In this case, the presence of the data register 46 is of no consequence.

Similar considerations apply when the data word is being transferred in the opposite direction, namely, from the host processor data bus 34 to the storage units 22a and 22b. If the storage units 22a and 22b are not ready in time, then the data word is temporarily held in the data register 46 and the drivers 45 are not enabled until the storage units 22a and 22b become ready. Thus, the use of the data register 46 helps take into account differences in timing between the host processor 1 and the I/O controller 2.

Before discussing the various addressing related mechanisms, it is helpful to consider the various items that may appear at different times on the host processor channel bus 8. These items are shown and explained in FIGS. 3-7. More particularly, these figures explain the usage of the host processor channel bus 8 as set forth by the architectural requirements for the IBM Series/1 I/O channel bus. FIG. 3 shows the layout of the immediate device control block (IDCB) which the host processor 1 places on the channel bus 8 when it wants to send an I/O command to a peripheral unit such as the I/O controller 2. This is a 4-byte control block wherein the first byte (Byte 0) is an 8-bit I/O command, the second byte (Byte 1) is an 8-bit device address and the third and fourth bytes (Bytes 2 and 3) contain either a 16-bit direct program control (DPC) data word or a 16-bit device control block (DCB) starting address. The I/O command (Byte 0) is sent out on the high order address byte bus 35a and the device address is sent out on the low order address byte bus 35b. The high order and low order bytes of the 2-byte data word or 2-byte DCB address are sent out on the respective ones of the high order data byte bus 34a and the low order data byte bus 34b, the high order byte being IDCB Byte 2 (bits 16-23) and the low order byte being IDCB Byte 3 (bits 24-31). All four of these IDCB bytes are sent out simultaneously.

The chart of FIG. 7 explains the significance of the different classes or categories of I/O operations for the different I/O commands. As is apparent, bit 1 of the I/O command is used to distinguish between read type and write type operations. Read operations are those where data or other information is to be transferred from an I/O unit to the host processor and, conversely, write operations are those where data or other information is transferred from the host processor to an I/O unit.

Another way of classifying the I/O operations is as to whether they are direct program control (DPC) operations or cycle steal operations. Considering first the case of DPC operations, each DPC read type command enables a 2-byte word of data or status information to be transferred from the I/O controller 2 to the host processor 1. Each DPC write type operation enables a 2-byte word of data or control information to be transferred from the host processor 1 to the I/O controller 2. The DPC data word (IDCB bits 16-31) is transferred by way of the channel data bus 34 and is stored into or transferred out of the dual port storage unit 22a, 22b, with the higher order byte (Byte 2 or bits 16-23) being stored into or read from the high byte storage unit 22a and the lower order byte (Byte 3 or bits 24-31) being stored in or read from the low byte storage unit 22b. This type of data transfer is called "DPC" because the transfer of each data word is under the direct control of the host processor program and the host processor must issue a separate I/O command for each word transferred.

As previously mentioned, the actual cycle stealing of data into or out of the host processor main storage unit 7 is controlled by the I/O controller 2. Before such cycle steal operations can be commenced, however, it is necessary for the host processor 1 to send a start cycle steal command to the I/O controller 2. Bytes 2 and 3 (bits 16-31) of the IDCB for such a start cycle steal command contain the address in main storage 7 at which is stored the first word (Word 0) of an eight-word device control block (DCB). A typical format for this eight-word device control block is shown in FIG. 4. The main storage starting address (Word 0 address) of this device control block is transferred by way of the channel data bus 34 and stored into the dual port storage units 22a and 22b. This main storage starting address is thereafter used by the I/O controller 2 to cycle steal the eight words of the FIG. 4 device control block out of the main storage unit 7, such DCB words being transferred to and stored into the dual port storage units 22a and 22b.

The microprocessor 11 thereafter uses the information contained in some of these DCB words to initialize the DMA controller 13 to the proper starting conditions for the desired data transfer cycle stealing operations. Thereafter the cycle stealing of the individual data words into or out of the main storage unit 7 is controlled by the DMA controller 13. For each of these individual data word transfers, the usage of the host processor channel bus 8 is as indicated in FIG. 5. The main storage data address is set from the I/O controller 2 to the host processor 1 via the channel address bus 35 and the data word to be transferred is transferred via the channel data bus 34. The main storage address is the address in the main storage unit 7 to which or from which the data word is to be transferred.

A further type of data word that is at times transferred by way of the channel data bus 34 is the interrupt identification (ID) word shown in FIG. 6. This interrupt ID word is sent from the I/O controller 2 to the host processor 1 for purposes of notifying the host processor 1 of some condition or event that has occurred out in the I/O controller 2 or to notify the host processor 1 that the I/O controller 2 needs service or, more accurately, that the I/O unit identified by the device address needs service. The interrupt information byte (IIB) identifies the type of service that is needed. As will be seen, the proper interrupt ID word is set into the storage units 22a and 22b by the microprocessor 11 and is thereafter transferred from such storage units 22a and 22b to the host processor 1 by way of the channel data bus 34.

As indicated in FIG. 2A, the address decoder 23 includes an 8-bit address comparator circuit 50. One set of input terminals for this comparator 50 is coupled by way of two-way drivers 51 to the low order address byte bus 35b for receiving the device address byte portion of an IDCB. The other set of input terminals for the comparator 50 is coupled to address jumpers 52 which are jumpered to represent the predetermined or preassigned device addresses which are assigned to the I/O units which are attached to the I/O controller 2. When the device address appearing on the low byte address bus 35b matches one of the device addresses provided by jumpers 52, the address comparator 50 produces a "controller select" signal on an output line 53. If, at this time, the host processor 1 is sending out an address gate signal on the address gate line of the channel control bus 36 (which will be the case if a valid IDCB is present on the channel bus 8), then an AND circuit 54 will produce an address gate capture signal on its output line 24. Among other things, this address gate capture signal is supplied by way of a driver circuit 55 to produce an address gate return signal on the address gate return line of the channel control bus 36. This tells the host processor 1 that the device address has been properly detected and that the I/O controller 2 is ready to proceed with the IDCB data transfer.

For sake of example, it is assumed that the two-way drivers 51 are comprised of two Intel 8286 8-bit parallel bidirectional driver units. For simplicity, they are shown as a single block in FIG. 2A. One of these 8-bit drivers connects the high byte channel address bus 35a to an internal high byte address bus 56, while the other of these 8-bit drivers connects the low byte channel address bus 35b to an internal low byte address bus 57. The orientation of the drivers 51 is such that, when the direction control signal D is at the zero level, the drivers 51 are set to transfer data from left to right or, in other words, from the channel address bus 35 to the internal buses 56 and 57. The output enable control terminal OE (not shown) of drivers 51 is permanently connected to a voltage source so that the outputs of such drivers 51 are always enabled. Because of this and because the direction control signal is normally at the zero level to provide a left to right data transfer direction, the address comparator 50 is able to monitor the low byte address bus 35b on an almost continuous basis. The only time it cannot is when a main storage address is being sent to the host processor 1 by the cycle steal address register 27. During such a main storage address transfer, a cycle steal service gate (CS/SG) capture signal is present to place the direction control terminal D at the one level to cause the direction of data transfer to be from right to left for the duration of such signal.

The cycle steal address register 27 is a 16-bit register and, for example, may be comprised of a pair of Intel 8282 8-bit input/output port units. The main storage address to be sent to the host processor 1 is obtained from the DMA controller 13 via microprocessor address buses 38a and 38b and is strobed into the address register 27 by the output signal from an AND circuit 58. This strobe signal is produced when the AND circuit 58 receives both a MEMW (memory write) signal from the MEMW line of the microprocessor control bus 39 and a DACK 0 signal from the DMA controller 13. These signals will be discussed in greater detail hereinafter. The output enable signal for the address register 27 is provided by the same service gate capture signal as was discussed for the drivers 51.

When needed, the device address value provided by the address jumpers 52 can be supplied by way of 8-bit drivers 59 to the microprocessor data bus 37. More particularly, the microprocessor 11 can transfer this address jumper address value to the low byte storage unit 22b for purposes of providing the device address portion of the interrupt ID word shown in FIG. 6.

The appearance of an address gate capture signal on line 24 causes several things to happen. For one thing, it enables a device select decoder 60 to decode the device address appearing on the internal low byte address bus 57 and to activate the particular one of its device select output lines 26 which corresponds to that device address. Thus, for example, if the device address on the internal bus 57 is for I/O device A, then the device A device select line is energized. As previously indicated, these device select lines 26 run to the programmable interrupt controller 14 as is better shown in FIG. 2D. These devices select lines A-D are connected to four different interrupt request inputs of the interrupt controller 14.

When one of these device select lines is activated, it causes the interrupt controller 14 to send an interrupt request signal to the microprocessor 11 by way of the microprocessor control bus 39. After acknowledgment of the interrupt request by the microprocessor 11 (via an interrupt acknowledgment signal on another line of the control bus 39), the interrupt controller 14 will send to the microprocessor 11 a CALL instruction which causes the microprocessor 11 to branch to the appropriate service routine for processing the I/O command for the I/O device to which such command is directed. A separate command processing service routine is provided in the control program storage 12 for each of the different I/O units or I/O devices attached to the I/O controller 2.

At this point it should be noted that the I/O controller of FIG. 2 uses a pair of programmable interrupt controllers, as opposed to the single interrupt controller 14 shown in FIG. 1. The second interrupt controller is identified by reference numeral 61 and is connected in cascade with the first interrupt controller 14 to provide, in effect, a single interrupt controller capable of handling twice as many interrupt requests. The second interrupt controller 61 is also assumed to be an Intel 8259 programmable interrupt controller. The operation of two such controllers in a cascade fashion is adequately covered in the Intel technical literature and will not be repeated herein.

A second result which is produced by the appearance of an address gate capture signal on line 24 is that the I/O command appearing on internal address bus 56 is stored into the command register file 25. For sake of example, it is assumed that command register file 25 is comprised of two Texas Instruments type SN74LS670 4-by-4 register files. These register files are manufactured and marketed by Texas Instruments, Inc., of Dallas, Tex. These two 4-bit wide register files are operated in unison to provide, in effect, a single register file having a width of 8 bits or 1 byte, with the four one-byte locations being separately addressable. In other words, register file 25 is just like a stack of four addressable 1-byte registers. The construction of the register file 25 is such as to permit simultaneous writing into one of the byte locations and reading from another of the byte locations.

The address gate capture signal on line 24 is supplied to the write enable terminal of the register file 25 and the lowest order two address bits on the low order internal address bus 57 are supplied to the write select or write addressing terminals of the register file 25. In the present embodiment, the four I/O devices attached to the I/O controller 2 are assigned four consecutive device addresses. In this case, the two lowest order device address bits appearing on bus 57 are sufficient to distinguish between the four I/O device addresses. Thus, a different one of the 1-byte locations in the register file 25 is assigned to each of the different I/O devices attached to the I/O controller 2. For purposes of explanation, it is assumed herein that the two lowest order address bits on the bus 57 have the following relationship to the I/O units: 00 is for device A, 01 is for device B, 10 is for device C and 11 is for device D. The I/O commands appearing on the bus 56 are stored at the locations in the register file 25 according to the device addresses and, hence, the I/O devices for which they are intended. Thus, any I/O command for device A is stored at the 00 location, any command for device B is stored at the 01 location, etc.

The microprocessor 11 controls the readout of the I/O commands from the register file 25. In particular, the microprocessor 11 executes a memory read or move from memory instruction wherein the address it places on the microprocessor address bus 38 is such as to produce a chip select 5 (CS5) signal and the two lowest order address bits on the microprocessor address bus 38 are of the appropriate value to select the desired byte in the register file 25. The CS5 signal is supplied to the read enable terminal of the register file 25 and the two lowest order address bits are supplied to the read select terminals of the register file 25. This causes a readout of the desired I/O command which is then transferred to the microprocessor 11 via a bus 62 and the microprocessor data bus 37.

The I/O controller 2 further includes address selector circuitry 63 for selectively transferring address bits from either the microprocessor address bus 38 or the host processor channel address bus 35 to the address circuitry of the random access storage mechanism 22a, 22b. Thus, the storage units 22a and 22b can be addressed by either the host processor 1 or one of the address producing units connected to the microprocessor bus 16. In the present embodiment, each of the microprocessor 11 and the DMA controller 13 can supply addresses to the microprocessor bus 16 for purposes of addressing the storage units 22a and 22b.

This microprocessor bus addressing is indicated by the buses 64 and 65 which, respectively, connect the microprocessor address buses 38a and 38b to one set of input terminals of the address selector 63. The other set of input terminals of the address selector 63 is connected to the internal address buses 56 and 57 which are, in turn, connected to the host processor address buses 35a and 35b, respectively. Under the control of a control signal from the storage control logic 48, the address selector 63 selects which of these two address inputs is to be supplied to the address terminals of the storage units 22a, 22b. As indicated by the common address bus 66, the address value appearing at the output terminals of the address selector 63 is always supplied to both of the storage units 22a and 22b. Further details of the address selection process will be discussed hereinafter in connection with FIG. 13.

For sake of example, it is assumed that the address selector 63 is comprised of four Texas Instruments type SN74LS257A 2-line-to-1-line data selector units. These units are marketed by Texas Instruments, Inc., of Dallas, Tex., and each such unit is capable of handling the two-to-one selection for four output lines. Thus, four such units can handle the two-to-one selection for 16 output lines. As will be seen, some of these 16 possible output lines are not used for addressing the storage units 22a and 22b and, hence, are left disconnected.

For the present moment, it can be assumed that the allow host connect signal produced by the storage control logic 48 and supplied to the address selector 63 by way of line 67 is produced in response to the address gate capture signal and corresponds to such address gate capture signal. This is approximately correct and will suffice for purposes of the explanation being given at this point. The binary one level of this allow host connect signal on line 67 causes the address selector 63 to switch to the left hand input terminals to supply the host processor address bus bits to the storage units 22a and 22b. Conversely, when the allow host connect signal is not present on the line 67, this line goes to a binary zero value and the address selector 63 is switched to select the right hand input terminals to connect the microprocessor address bus bits to the storage units 22a and 22b.

As can be seen from the foregoing, the appearance of the address gate capture signal on line 24 causes three primary things to happen. First, it enables the device select decoder 60 to supply a unique device indicative signal to the programmable interrupt controller 14. Secondly, it causes the I/O command to be stored into the register file 25. Thirdly, it causes a host processor derived address value to be supplied to the storage units 22a and 22b. This, together with related control signals supplied to the drivers 44 and 45 and the data register 46, enables the data word portion of the IDCB to be transferred from the host processor channel data bus 34 to the storage units 22a and 22b, or vice versa.

Thus, all four bytes of the immediate device control block (IDCB) are digested by the I/O controller 2 during one and the same interval of time, this being the interval of time at which they are placed on the host processor channel bus 8 by the host processor 1. Also, this digesting of the IDCB bytes is transparent to the microprocessor 11. The microprocessor 11 does not know that it has happened, except at such later time as it receives and accepts an interrupt request from the programmable interrupt controller 14. The fact that the I/O controller 2 is always capable of accepting the immediate device control block when it is presented by the host processor means that the I/O controller 2 never has to return a "controller busy" signal to the host processor 1. This, of course, prevents lost time on the part of the host processor 1.

The I/O controller 2 also includes a chip select decoder 68 which is responsive to the higher order address bits on the microprocessor address bus 38a for decoding same to produce various chip select signals CS0, CS1, CS2, . . . CSn. These chip select signals are used to select or enable different ones of the other units in the I/O controller 2. Thus, for example, the chip select signal CS0 is used to select the control program storage 12, the chip select signal CS1 is used by way of an AND circuit 69 to enable the two-way drivers 41 and the chip select signal CS2 is used by way of an AND circuit 70 to enable the two-way drivers 40. The CS1 and CS2 signals are also used to select between the two different ones of the storage units 22a and 22b, this being accomplished by way of the storage control logic 48. In this regard, the CS3 chip select signal is used via the logic 48 to simultaneously select both of the storage units 22a and 22b. This simultaneous selection is done for purposes of transferring data words between the host processor data bus 34 and the storage units 22a and 22b during the cycle stealing operations controlled by the DMA controller 13. Thus, it is the DMA controller 13 which supplies the address to the chip select decoder 68 to produce the CS3 chip select signal.

Figure 2B:
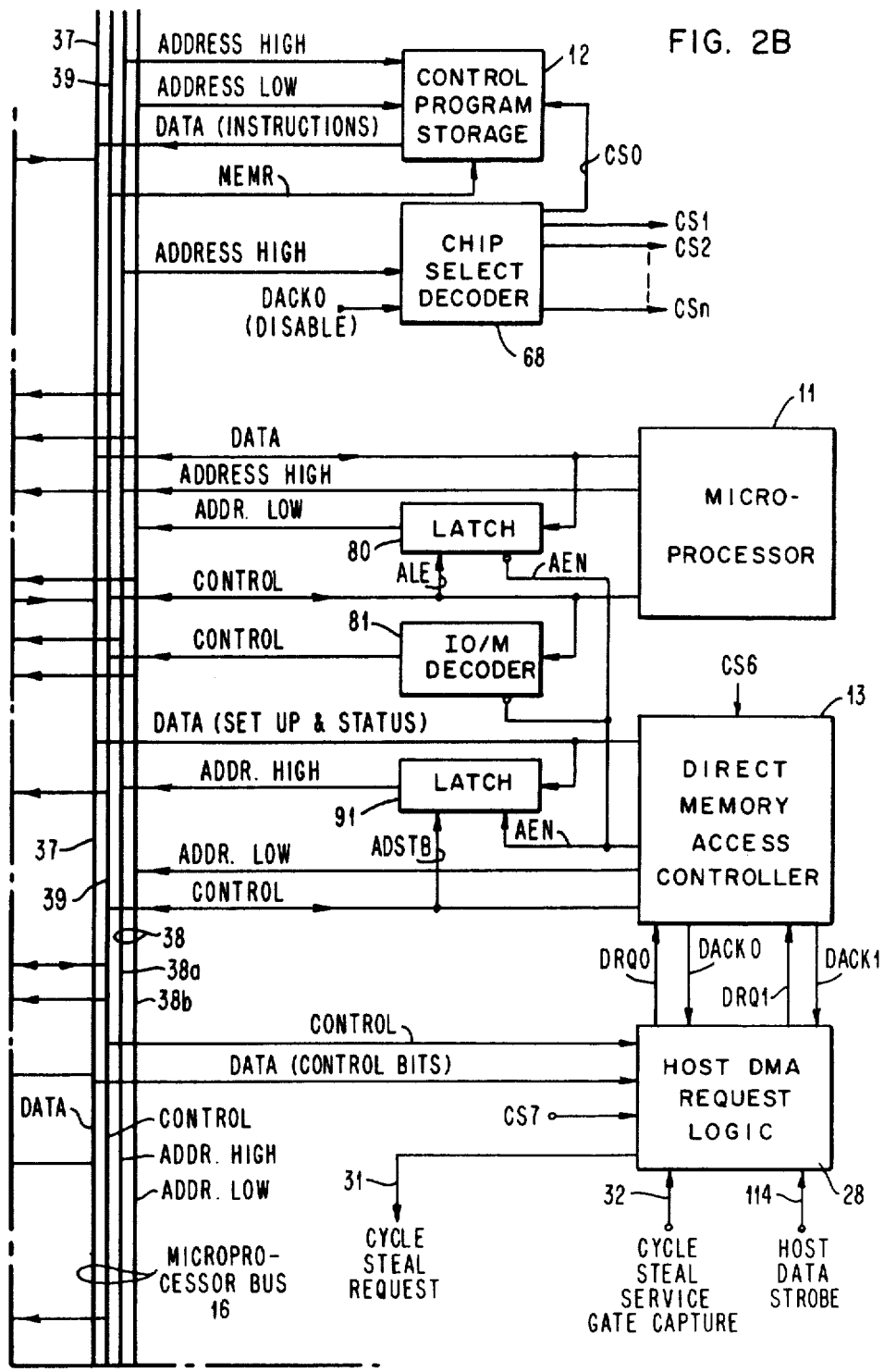
Figure 2D:
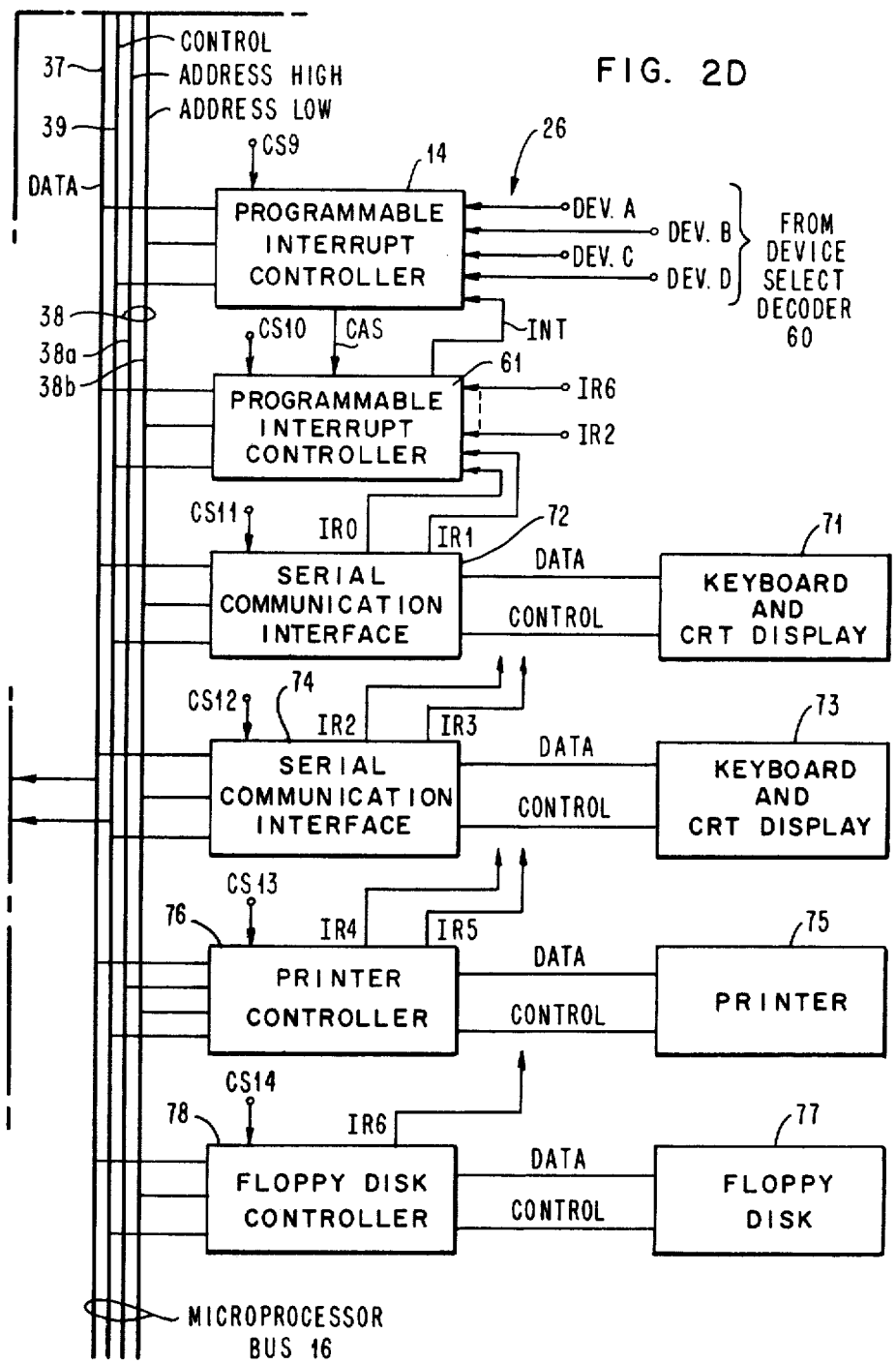

Referring to FIG. 2D, there is shown examples of four specific I/O units that can be attached to the microprocessor bus 16. The first I/O unit is comprised of a keyboard and cathode ray tube (CRT) display device 71 and its associated serial communication interface 72. The second I/O unit is comprised of a keyboard and CRT display device 73 and its associated serial communication interface 74. The third I/O unit is comprised of a wire matrix printer 75 and its associated printer controller 76. The fourth I/O unit is comprised of a floppy disk storage unit 77 and its associated floppy disk controller 78. Each of the serial communication interfaces 72 and 74 can be, for example, an Intel 8251A programmable communication interface unit. This is a universal synchronous/asynchronous receiver/transmitter (USART) and is currently manufactured and marketed by the Intel Corporation of Santa Clara, Calif. The printer controller 76 can be, for example, either an Intel 8048 or an Intel 8049 microprocessor. The floppy disk controller 78 can be, for example, an Intel 8271 programmable floppy disk controller.

The foregoing particular types of I/O devices and device control units are intended as examples only. A wide variety of different makes and types of I/O units are available and can be attached to the microprocessor bus 16 in place of one or more of those described above.

Operation Of The FIG. 2 Controller Embodiment

Considering briefly a typical data transfer operation for the I/O controller 2 of FIG. 2, it is initially noted that successive data bytes received from an I/O device are alternately stored in the high byte storage unit 22a and the low byte storage unit 22b. Considering the case where data is being transferred from an I/O device to the host processor 1 and assuming, for example, the I/O device is the keyboard/display unit 71, the data bits are transmitted serially from the keyboard display unit 71 to the serial communication interface (serializer/deserializer) 72. After the first byte of data is assembled in the interface 72, it is transferred by way of the microprocessor data bus 37 to the microprocessor 11 and then from the microprocessor 11 via the data bus 37 and the two-way drivers 40 to the high byte storage unit 22a. After the second byte of data is assembled by the interface 72, it is transferred by way of the microprocessor data bus 37 to the microprocessor 11 and then by way of the microprocessor data bus 37 and the two-way drivers 41 to the low byte storage unit 22b. Subsequent successive bytes are alternately stored in this same manner in the high byte storage unit 22a and the low byte storage unit 22b, the third, fifth, seventh, etc., bytes being stored in the high byte storage 22a and the fourth, sixth, eighth, etc., bytes being stored in the low byte storage 22b.

After the desired amount of data for the I/O device in question has been accumulated in the dual port storage units 22a and 22b, such data is thereafter transferred to the host processor 1. When data is transferred to the host processor 1, it is transferred to such host processor two bytes or one word at a time. In other words, a high order byte is read out of the storage unit 22a simultaneously with the readout of a low order byte from the storage unit 22b and both such bytes are simultaneously transferred to the host processor 1 by way of the two-way drivers 45 and 44 and the host processor channel data bus 34. As an intermediate step, the two-byte data word may be temporarily stored in the 16-bit data register 46. This intermediate step (which won't be performed if the host processor responds fast enough) enables adjustment of the controller timing to the host interface handshake timing.

When data is being transferred in the opposite direction, namely, from the host processor to the I/O device, then the opposite kind of thing happens. Each 2-byte data word is sent to the I/O controller 2 via the host processor data bus 34 and the high order byte is stored in storage unit 22a and the low order byte is stored in storage unit 22b. The data bytes subsequently transferred to the I/O device are alternately taken from the high byte storage unit 22a and the low byte storage unit 22b.

The use of the separate high byte and low byte storage units 22a and 22b provides an automatic byte-to-word (or word-to-byte) formatting which is one of the novel inventive features which is incorporated in the I/O controller 2.

In the FIG. 2 embodiment, the transfer of data between the I/O device and the dual port storage units 22a and 22b is controlled by the microprocessor 11. When the I/O device is ready for the transfer of a data byte, it supplies an interrupt request (IR) to the programmable interrupt controller (PIC) 61. PIC 61 then sends an interrupt request to the microprocessor 11 which thereafter causes the microprocessor 11 to perform the necessary instruction routine for transferring a byte of data from the dual port storage 22 to the I/O device or vice versa. The interrupt line running to the microprocessor 11 is one of the control lines in the microprocessor control bus 39.

In the FIG. 2 embodiment, data is normally transferred between the host processor 1 and the dual port storage units 22a and 22b in a cycle steal mode. These cycle stealing operations are controlled by the DMA controller 13 and host DMA request logic 28. The internal construction of the DMA controller 13 will be hereinafter described in connection with FIG. 10. As will be seen, such DMA controller 13 includes four separate address counters which are normally used to perform DMA operations for four different I/O devices. In the present I/O controller 2, however, this DMA controller 13 is not used in the normal manner. Instead, one of the DMA address counters is used to keep track of the host processor main storage address and another of the DMA address counters is used to keep track of the addresses for the dual port storage units 22a and 22b. Whenever a particular DMA request (DRQ) line is activated, the DMA controller 13 puts the corresponding address counter address onto the 16-bit microprocessor address bus 38. If two or more DMA request (DRQ) lines are active at the same time, then a priority resolver inside the DMA controller 13 selects and processes the requests one at a time in the appropriate order.

For any given data word transfer, the DMA request logic 28 first activates the DRQ 0 line. This causes the DMA controller 13 to put the host processor main storage address to be used for this data word transfer onto the microprocessor address bus 38. This address is then strobed into the cycle steal address register 27, whereafter it is placed on the 16-bit host processor address bus 35 by way of the two-way drivers 51. At the appropriate point after the main storage address is strobed into the cycle steal address register 27, the DRQ 1 request line is activated and/or recognized by the DMA controller 13 to cause the DMA controller 13 to put the storage address for the dual port storage units 22a and 22b onto the microprocessor address bus 38. This address is then transferred to the storage units 22a and 22b by way of the address selector 63. This address is the dual port storage address to or from which the data word is transferred.

The foregoing DRQ 0/DRQ 1 sequence is repeated for each data word transferred. The two DMA address counters which are being used for these transfers are incremented after each data word transfer. The host DMA request logic 28 also initiates the generation of the cycle steal requests which are sent to the host processor 1, each such request being commenced immediately after the leading edge of the DRQ 0 signal is sent to the DMA controller 13.

Figure 8:
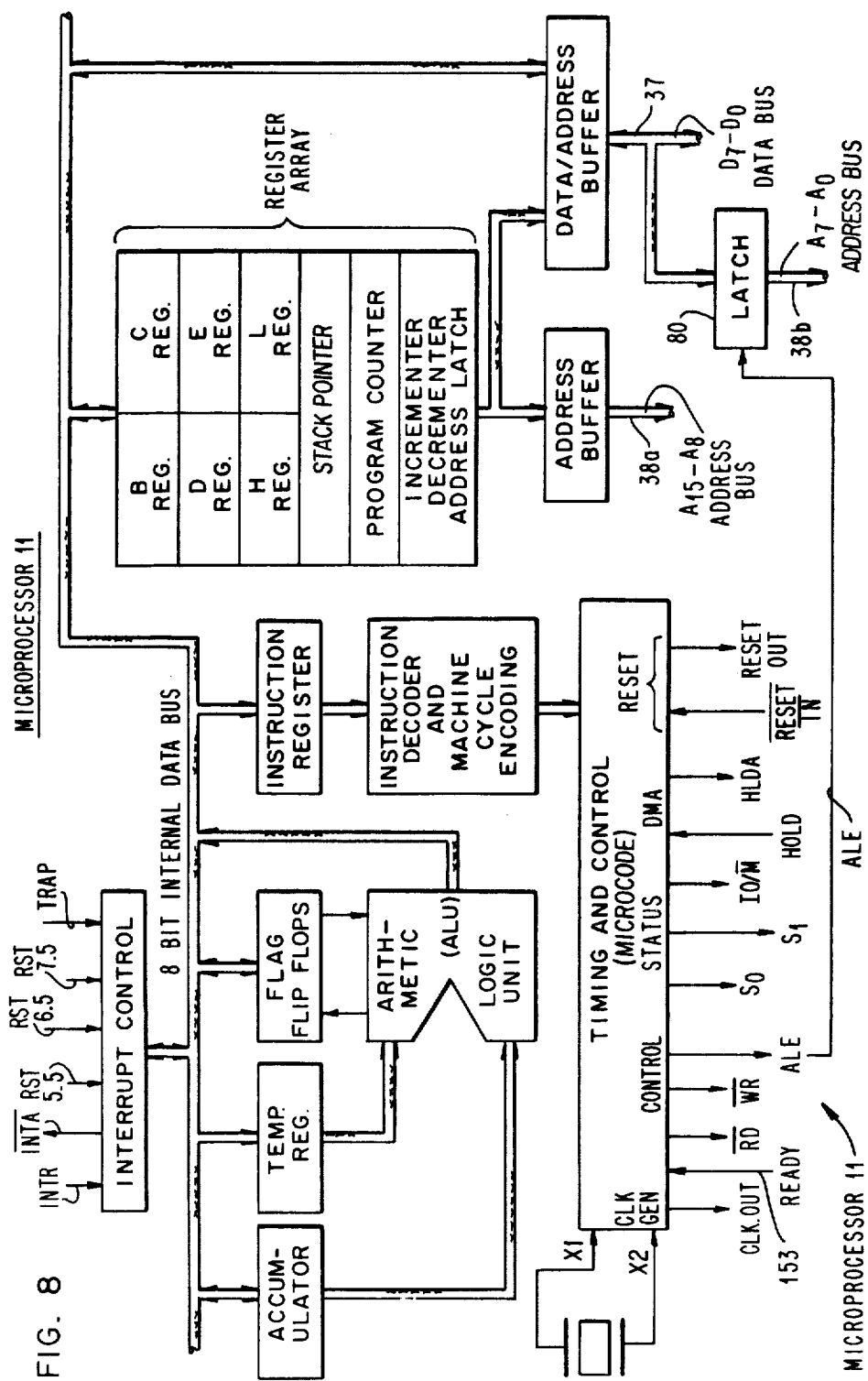
FIG. 8 shows in greater detail the internal construction of a typical microprocessor which may be used in the FIG. 2 I/O controller.

Description Of The FIG. 8 Microprocessor

FIG. 8 shows in greater detail one possible form of internal construction for the microprocessor 11 of FIG. 2. The microprocessor shown in FIG. 8 is the Intel 8085A single chip 8-bit microprocessor. With respect to the abbreviations used in FIG. 8, CLK means "clock", RD means "read", WR means "write", ALE means "address latch enable" and HLDA means "hold acknowledge". The S0 and S1 lines are data bus status lines and the IO/$\overline{M}$ line indicates whether the read/write is a memory read/write or an I/O read/write. The abbreviation INTR stands for "interrupt request" and the abbreviation INTA stands for "interrupt acknowledge". The three RST inputs are restart interrupt inputs.

Figure 9:
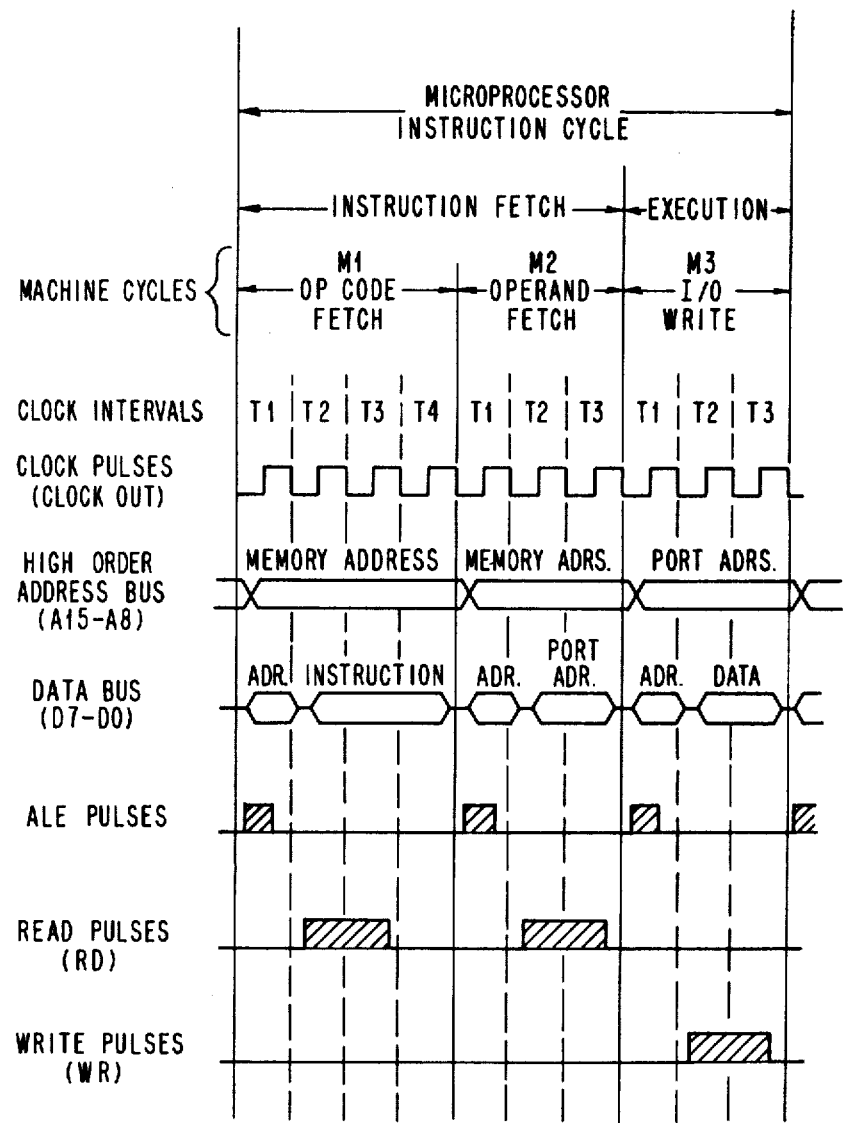
FIG. 9 is a timing diagram showing what happens for a more or less typical instruction cycle for the microprocessor of FIG. 8.

FIG. 9 is a timing diagram showing what happens for a more or less typical instruction cycle for the microprocessor 11. The particular instruction cycle which is shown in FIG. 9 is for the OUT instruction which causes the content of the microprocessor accumulator register to be placed on the microprocessor data bus 37 for transmission to the I/O port specified by the address placed on the microprocessor address bus 38. Actually, the term "I/O port" in the previous sentence is inaccurate in the sense that the content of the accumulator register will be transmitted to any element or device which is connected to the microprocessor bus and which is responsive to or selected by the particular "port" address appearing on the microprocessor address bus 38.

An interesting peculiarity of the 8085A microprocessor is that the low order address bits (bits 0-7) are time multiplexed on the data bus output of the 8085A. As indicated in both FIG. 8 and FIG. 2B, these low order address bits are immediately latched into an 8-bit latch 80 by the address latch enable (ALE) output pulse of the microprocessor. Latch circuits 80 in turn drive the low order 8-bit microprocessor address bus 38b.

The IO/$\overline{M}$ decoder 81 shown in FIG. 2B is used to convert the microprocessor RD, WR and IO/$\overline{M}$ output signals into the following four more conventional signals: MEMR, MEMW, IOR and IOW, which respectively stand for memory read, memory write, I/O read and I/O write. These four signals produced by the IO/$\overline{M}$ decoder 81 are supplied to and appear on four separate control lines of the microprocessor control bus 39. These signals are used by various other of the units in the I/O controller 2. As will be seen, the DMA controller 13 is also connected to these four additional control lines and can also produce these MEMR, MEMW, IOR and IOW signals.

The READY control terminal of the microprocessor 11 is of particular interest. It provides a means for enabling external circuitry to place the microprocessor 11 in a "wait" state. More particularly, the microprocessor 11 includes internal circuitry which is responsive to the absence of the external READY signal for placing the microprocessor 11 in a "wait" state. When the READY signal reappears, the microprocessor 11 resumes its operations just as if nothing had happened.

Figure 10:
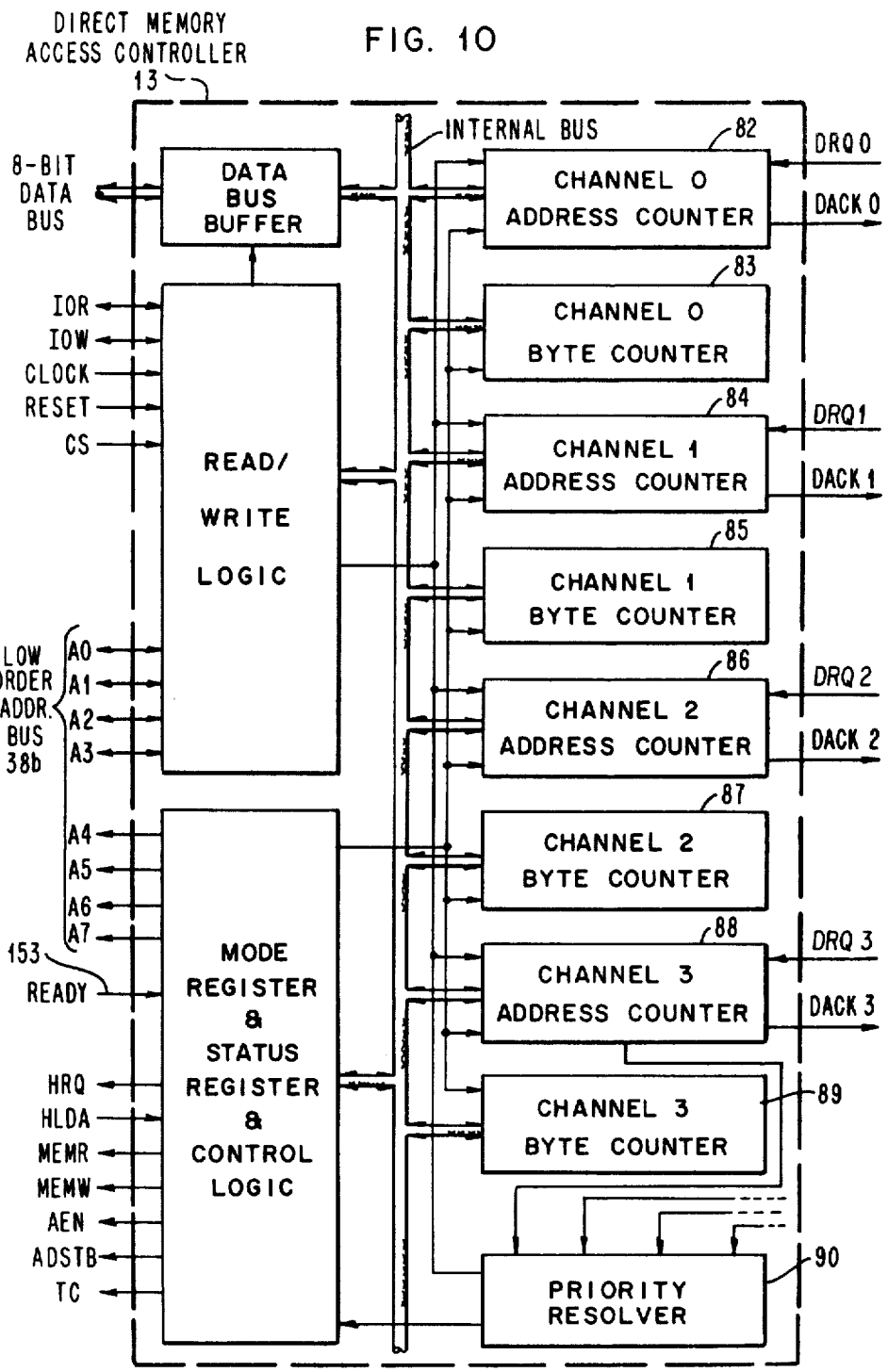
FIG. 10 shows in greater detail the internal construction of a typical plural channel direct memory access (DMA) controller which can be used in the FIG. 2 I/O controller.

Description Of The FIG. 10 DMA Controller

FIG. 10 shows in greater detail one possible form of internal construction for the direct memory access (DMA) controller 13 of FIG. 2. The DMA controller shown in FIG. 10 is the Intel 8257 single chip four-channel programmable DMA controller. The abbreviations used in FIG. 10 are as follows:

| Term | Meaning |
|---|---|
| IOR | I/O Read |
| IOW | I/O Write |
| CS | Chip Select |
| HRQ | Hold Request |
| HLDA | Hold Acknowledge |
| MEMR | Memory Read |
| MEMW | Memory Write |
| AEN | Address Enable |
| ADSTB | Address Strobe |
| TC | Terminal Count |
| DRQ | DMA Request |
| DACK | DMA Acknowledge |

The DMA controller 13 includes four separate channels, namely, channels 0-3, which are normally used to perform DMA operations for four different I/O devices. Each channel includes its own address counter and byte counter. Thus, channel 0 includes address counter 82 and byte counter 83, channel 1 includes address counter 84 and byte counter 85, channel 2 includes address counter 86 and byte counter 87 and channel 3 includes address counter 88 and byte counter 89. The purpose of each address counter is to provide for a particular I/O device the addresses needed for addressing a storage unit, these addresses being the addresses of the storage locations which are to receive data from or supply data to the particular I/O device in question. The purpose of each byte counter is to provide for its particular I/O unit a count showing the number of bytes remaining to be transferred for the usual case where a multi-byte block of data is to be transferred. With respect to a particular I/O device, its DMA address counter is incremented and its byte counter is decremented after each byte is transferred for such I/O device.

The DMA controller 13 also includes a priority resolver 90 for handling the case where two or more of the DMA request (DRQ) input lines are active at the same time. In such case, the priority resolver 90 selects and processes the requests one at a time in the appropriate order. As will be discussed in greater detail hereinafter, the DMA controller 13 is operated in its rotating priority mode when used in the I/O controller embodiment of FIG. 2. In this rotating priority mode, the priority of the channels has a circular sequence. After each DMA channel is serviced, the priority of each channel changes. The channel which has just been serviced will be given the lowest priority.

Figure 11:
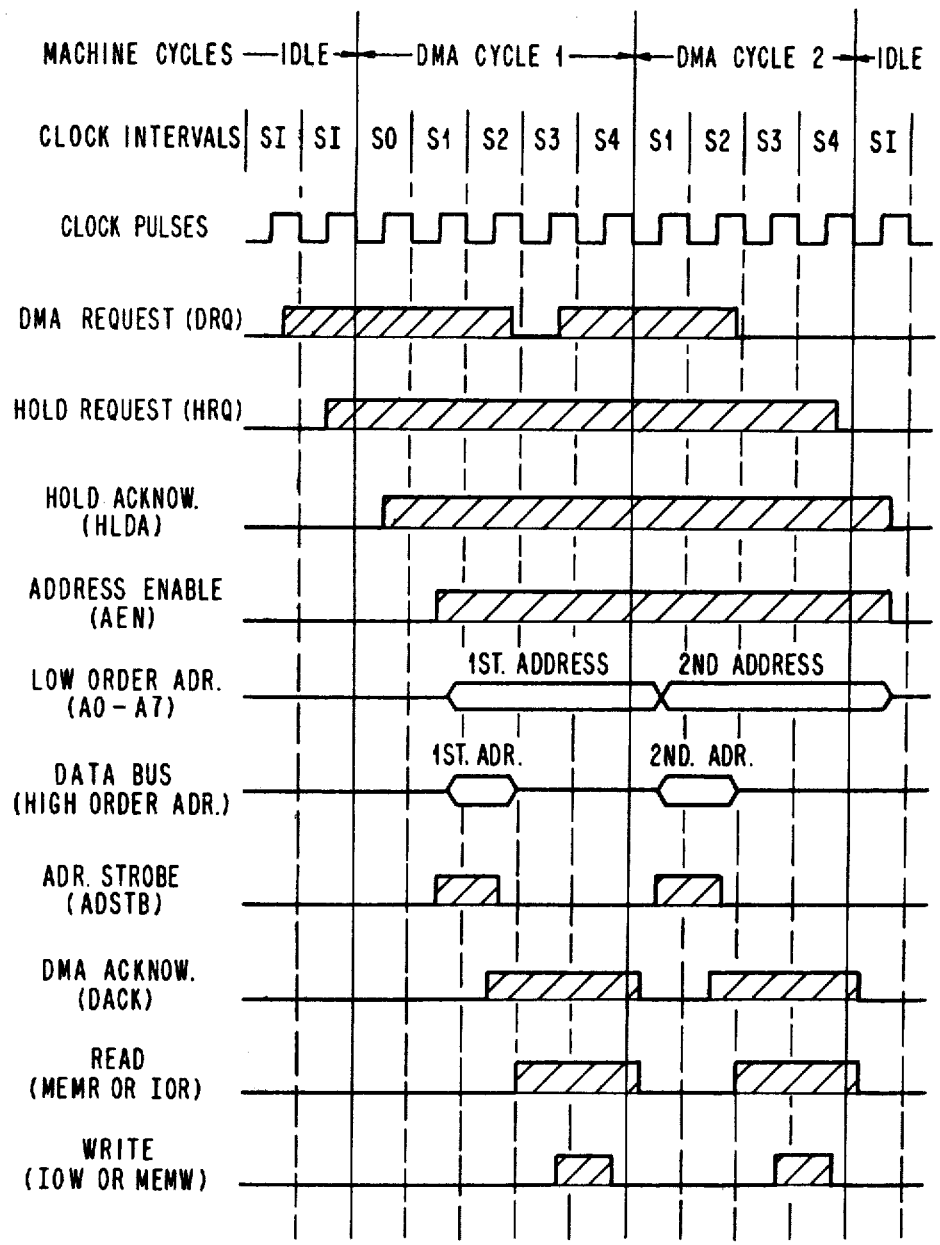
FIG. 11 is a timing diagram showing the various signal waveforms for two typical successive DMA cycles of the DMA controller of FIG. 10.

FIG. 11 is a timing diagram showing the various DMA signal waveforms for the case of two typical successive DMA cycles. When not active, the DMA controller 13 sits in an idle state (SI). The DMA controller 13 time multiplexes some of the address bits out of its data bus output in a manner similar to that which was done by the microprocessor 11. In the case of the DMA controller 13, however, it is the higher order address bits (8-15) which are multiplexed. As indicated in FIG. 2B, these high order address bits are immediately latched into a set of 8 latch circuits 91 by the address strobe (ADSTB) which is generated by the DMA controller 13.

A further point to note is that, when the DMA controller 13 is active, the operation of the microprocessor 11 is suspended by placing it in a "hold" state. More particularly, shortly after the DMA controller 13 receives a DMA request (DRQ), it sends a hold request (HRQ) to the HOLD terminal of the microprocessor 11 via the HOLD line of the microprocessor control bus 39. When the microprocessor 11 enters the "hold" state and so long as it remains in that state, it supplies a hold acknowledgment (HLDA) signal to the DMA controller 13. During this HLDA interval, the data and address outputs of the microprocessor 11 are placed in a three-state or high impedance condition so as not to affect the microprocessor data and address buses 37 and 38. Also, the output of the microprocessor address latch 80 and the IO/M decoder 81 are placed in the high impedance condition by the address enable (AEN) signal. Thus, during the HLDA interval, the DMA controller 13 can place addresses on the microprocessor address bus 38 and the devices or elements which respond to these addresses can place data on the microprocessor data bus 37 without interference from the microprocessor 11. The placement of data on and the reading of data from the microprocessor data bus 37 is controlled by the read and write pulses produced by the DMA controller 13.

The READY input control line for the DMA controller 13 provides the same function for the DMA controller 13 as was provided for the microprocessor 11 by its READY input control line. More particularly, when the READY signal is present (READY line at the binary one level), the DMA controller 13 operates in its normal manner. When, on the other hand, the READY signal is absent (READY line at a binary zero level), the DMA controller 13 will go into a "wait" state and will wait for the READY signal to reappear before completing the current DMA cycle. In the typical application, this "Not Ready" function is used to elongate the storage read and storage write cycles with Wait states for the case of relatively slow storage units.

Figure 12:
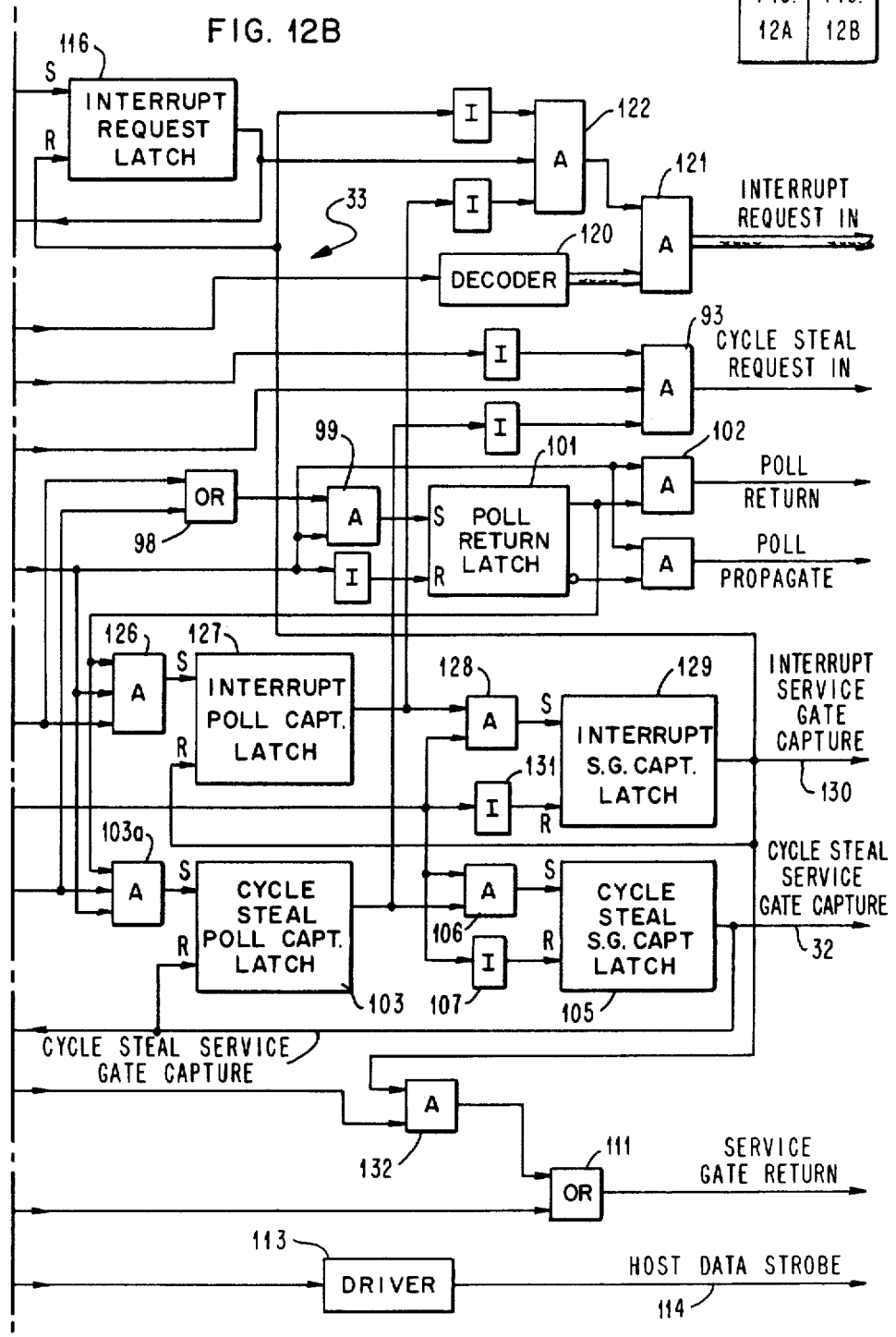
FIGS. 12A and 12B, when placed side-by-side in the manner indicated in FIG. 12, form a single figure which shows in greater detail the internal construction of the interrupt and cycle steal handshaking unit of FIG. 2C.

Description of FIG. 12 Interrupt And Cycle Steal Handshaking Unit

Figure 12A:
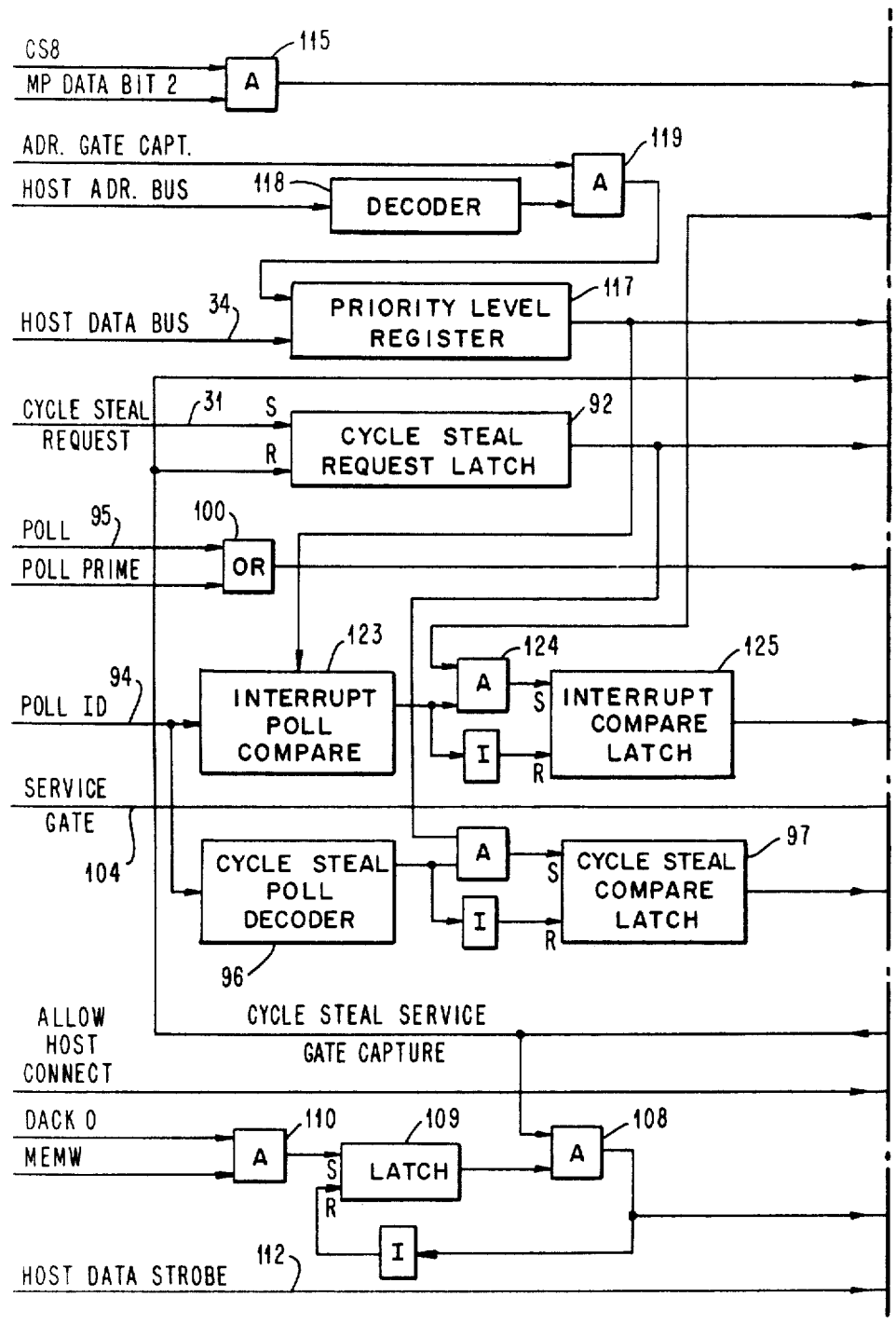

Referring now to FIGS. 12A and 12B, there is shown in greater detail the internal construction of the interrupt and cycle steal handshaking unit 33 of FIG. 2C. This unit handles the handshaking signaling sequences with the host processor 1 for two different cases. The first case is where the I/O controller 2 presents a cycle steal request to the host processor 1 for purposes of cycle stealing a data word into or out of the host processor main storage unit 7. The other case is where the I/O controller wants to present an interrupt request to the host processor 1.

Considering first the case of a cycle steal request, a cycle steal request signal is received from the host DMA request logic 28 by way of line 31 and is used to set a cycle steal request latch 92. This produces a cycle steal request signal at the output of latch 92, which signal is transferred by way of an AND circuit 93 to a cycle steal request in line in the host processor control bus 36. In due course, the host processor 1 recognizes this cycle steal request by sending out a 5-bit poll ID on the poll ID bus portion 94 of the channel control bus 36 and a poll signal on the control bus poll line 95.

A unique poll ID is used for responding to cycle steal requests and this unique poll ID is decoded by a cycle steal poll decoder 96. Decoder 96 then produces an output signal which sets a cycle steal compare latch 97. This produces a one level output at the output of latch 97 which is supplied by way of an OR circuit 98 to a first input of an AND circuit 99. The second input of AND circuit 99 receives the poll signal via OR circuit 100. These two signals being present at the two inputs of the AND circuit 99 cause a poll return latch 101 to be set. This supplies by way of an AND circuit 102 a poll return signal to the host processor 1 which tells the host processor 1 that the I/O controller is ready to proceed.

The set condition of the poll return latch 101 plus the presence of the poll signal at the output of OR circuit 100 plus the set condition of the cycle steal compare latch 97 causes a cycle steal poll capture latch 103 to be set via AND circuit 103a. After receipt of the poll return signal and when it is ready to do the data word transfer, the host processor 1 sends out a service gate signal on the service gate control line 104 of the channel control bus 36. This service gate signal, together with a set condition of latch 103, cause a cycle steal service gate capture latch 105 to be set via AND circuit 106. This starts the cycle steal service gate capture signal on the latch output line 32, which signal is used to control the operation of various other units in the I/O controller 2. This service gate capture signal on line 32 is terminated by the trailing edge of the service gate signal via NOT circuit 107.

The output of the service gate capture latch 105 is also supplied to a first input of an AND circuit 108. The second input of AND circuit 108 is controlled by latch 109. Latch circuit 109 is set via AND circuit 110 by the DACK 0 and MEMW signals which occur when the main storage address is strobed into the cycle steal address register 27. In other words, they occur when the host processor main storage address is ready and available to be sent to the host processor 1. The set condition of latch 109, plus the presence of the cycle steal service gate capture signal at the first input of AND circuit 108, produces a service gate return signal which is supplied by way of OR circuit 111 to the service gate return line in the channel control bus 36. This service gate return signal tells the host processor 1 that everything is proceeding according to schedule.

Subsequent to receipt of this service gate return signal, the host processor 1 sends out a data strobe signal on the host data strobe line 112 in the channel control bus 36. This data strobe signal is transferred by way of a driver circuit 113 to a line 114 which makes it available to the other units in the I/O controller 2. This data strobe signal is used, for example, to control the strobing of the data into the 2-byte data register 46 shown in FIG. 2a.

Considering now the interrupt portion of FIG. 12, the microprocessor 11 initiates an interrupt request by doing an I/O port type OUT instruction with the appropriate address and data bus values to cause activation of an AND circuit 115, which in turn causes an interrupt request latch 116 to be set. In other words, the address produced by the microprocessor 11 produces a CS8 chip select signal and the data value on the microprocessor data bus is such that data bit 2 has a one value. Before proceeding further, it is necessary to briefly consider the manner in which the IBM Series/1 type processors handle interrupt operations. In particular, they use a priority type interrupt system wherein each of the various I/O units attached to it are assigned one of several possible priority levels. In this scheme of things, the I/O unit presenting the interrupt must present its interrupt on a certain priority level interrupt line. This is accomplished by loading in advance into the I/O unit the priority level value to be used by such I/O unit.

In FIG. 12, this priority level value is loaded into the priority level register 117. This is accomplished by issuing a so-called "Prepare" command to the I/O controller 2, this command being detected by a decoder 118 to activate an AND gate 119, which is at that time receiving an address gate capture signal at its other input, with the output of the AND gate 119 being used to strobe into the priority level register 117 the desired priority level value then appearing on the channel data bus 34. The priority level value in register 117 drives a decoder 120 having multiple output lines, only one of which is activated in accordance with the priority level value supplied by the register 117. The multiple output lines of the decoder 120 are supplied by way of AND gates 121 to the multiple interrupt request in lines in the channel control bus 36. Only the particular interrupt request in line corresponding to the priority level value in the register 117 is activated by the decoder 120. The actual moment of presentation of the interrupt request to the host processor 1 is controlled by the interrupt request latch 116. When this latch 116 is in its set condition, it supplies a one level signal by way of AND circuit 122 to the AND gates 121. This supplies the interrupt request to the host processor 1.

In due course, the host processor 1 recognizes the interrupt request and responds thereto by sending out a poll ID on the channel control bus portion 94 and a poll signal on the channel control bus line 95. The value sent out on the poll ID bus 94 is the value of the interrupt level being used by this I/O controller. This value is compared in the interrupt poll compare unit 123 with the priority level value in the priority level register 117. If the priority level values match, then the interrupt poll compare circuit 123 produces a one level output which is supplied by way of AND circuit 124 to set an interrupt compare latch 125, provided a valid interrupt request is pending as indicated by the one level output of the interrupt request latch 116. Assuming the interrupt compare latch 125 is set, then this enables the poll return latch 101 to be set by the poll signal on channel control line 95. The setting of latch 101, as before, generates the poll return signal which is supplied back to the host processor 1.

The set condition of the interrupt compare latch 125 is supplied by way of an AND circuit 126 to set an interrupt poll capture latch 127, the other inputs to the AND circuit 126 at this time being at the binary one level.

In response to the poll return signal, the host processor 1 in due course sends out a service gate signal on the channel control line 104. This activates the second input to an AND circuit 128 which, together with the set condition of the interrupt latch 127, causes a setting of an interrupt service gate capture latch 129. This produces an interrupt service gate capture signal on line 130, this signal being used by other units in the I/O controller 2. The interrupt service gate capture latch 129 is reset by the trailing edge of the service gate signal on line 104 via NOT circuit 131.

The output of the interrupt service gate capture latch 129 is also supplied to an AND circuit 132, the other input of which is assumed to be activated at this moment by an allow host connect signal (to be discussed hereinafter). The resulting one level at the output of AND circuit 132 is supplied by way of the OR circuit 111 to provide the service gate return signal on the service gate return line in the channel control bus 36. This service gate return signal tells the host processor 1 that everything is proceeding according to schedule.

The foregoing interrupt and cycle steal handshaking mechanisms are particularly constructed for the case where the host processor 1 is an IBM Series/1 processor. It is to be clearly understood, however, that the invention is not limited to use with an IBM Series/1 type processor and can be used with other types of processors. Where another type of processor is used, the interrupt and cycle steal handshaking mechanisms would be modified where necessary to satisfy the peculiarities of such other type of processor.

A point to note from the foregoing is that two different types of service gate capture signals are produced, one being produced for the cycle steal of a data word to or from the host processor 1 and the other being produced when the I/O controller 2 desires to interrupt the host processor 1.

Figure 13A:
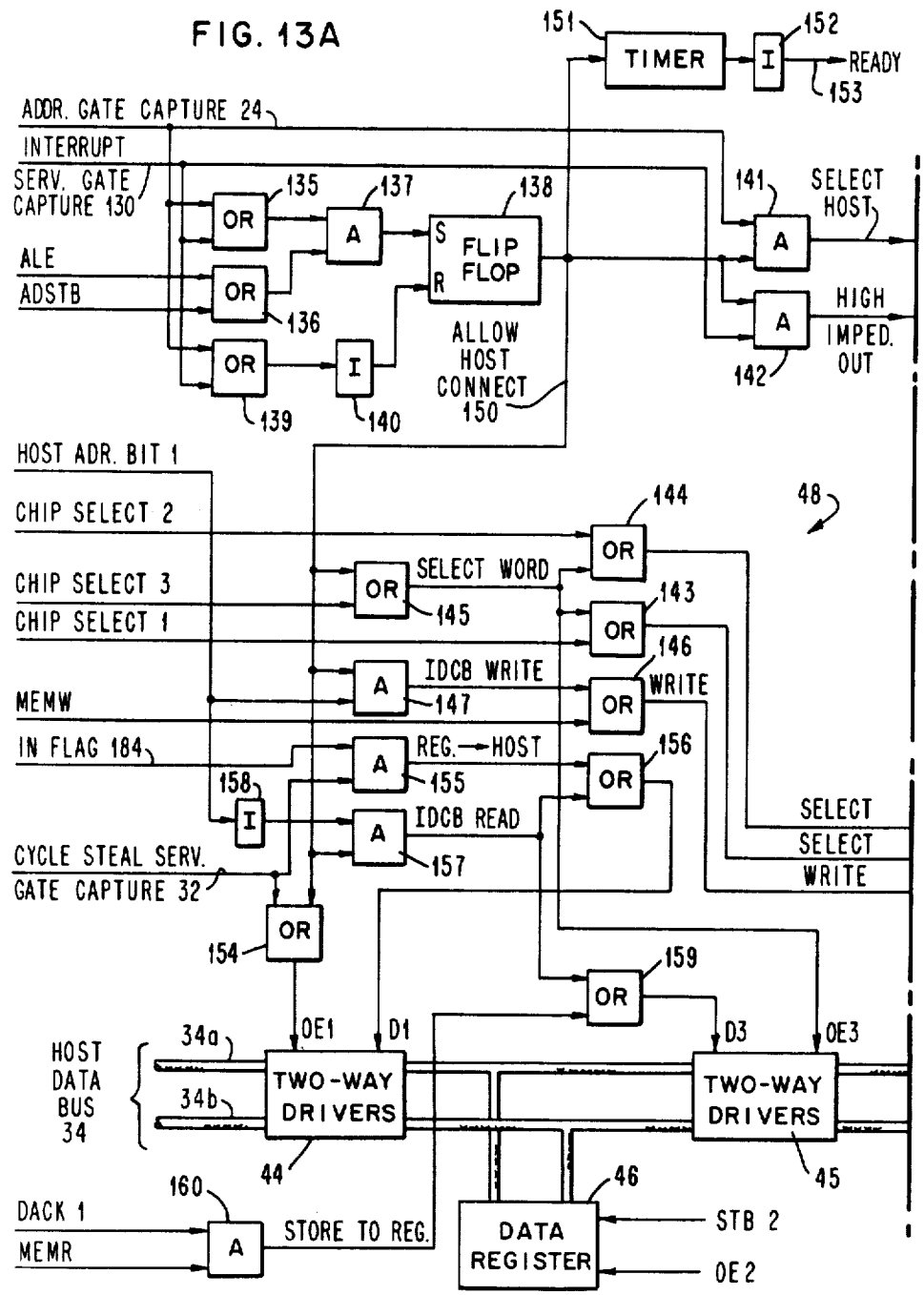
FIGS. 13A and 13B, when placed side-by-side in the manner indicated in FIG. 13, form a single figure which shows in greater detail the internal construction of the storage control logic of FIG. 2A and also shows the logic for developing the direction (D) and output enable (OE) signals for the two-way drivers which are used to transfer data between the host processor channel bus and the I/O controller storage units.
Figure 13B:
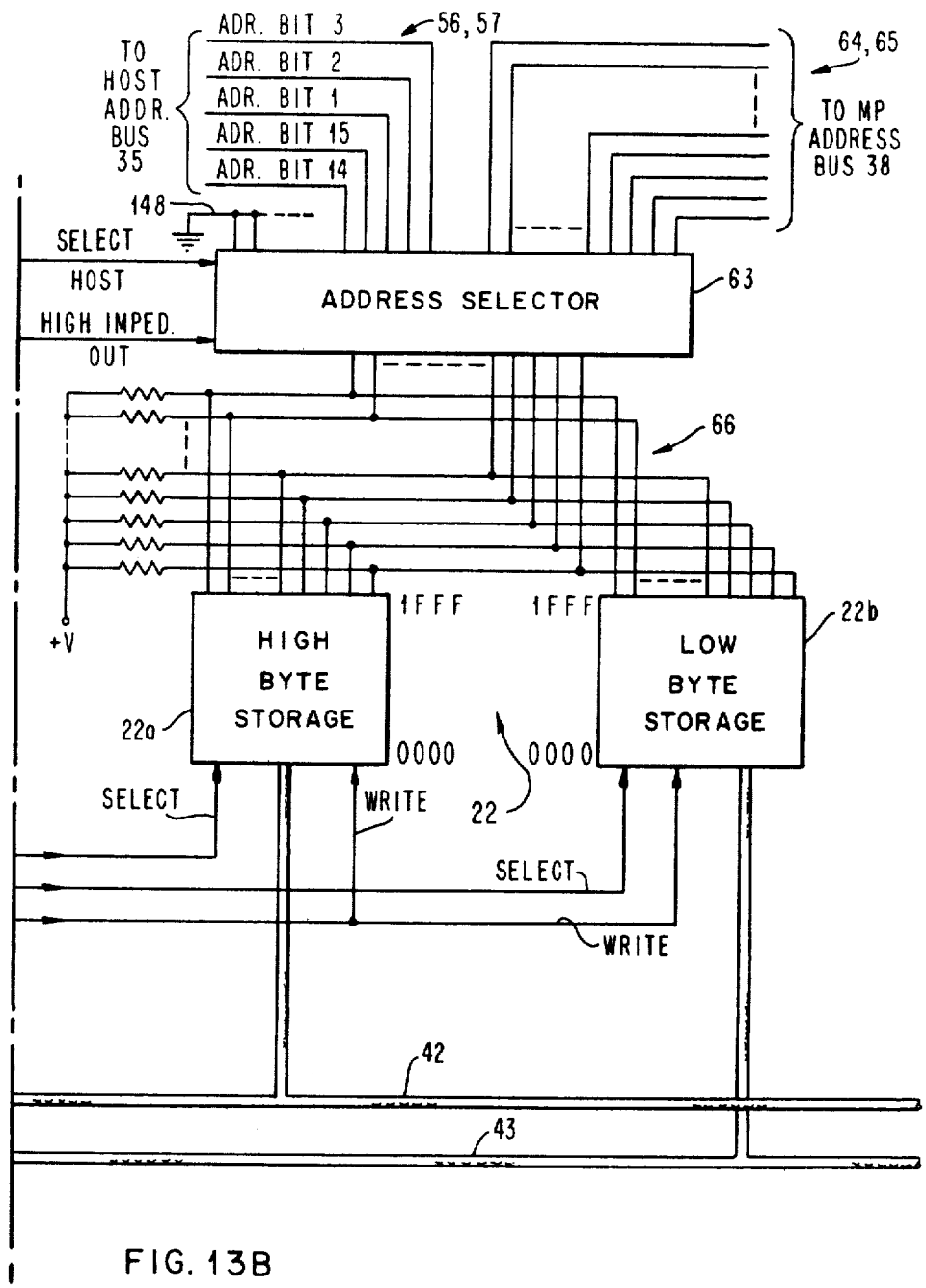
Figure 13:
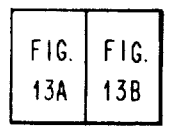

Description Of FIG. 13 Storage Control And Address Selection Logic

Referring now to FIGS. 13A and 13B, there is shown in greater detail the internal construction of the storage control logic 48 of FIG. 2A, this being the control logic for the dual port storage 22a, 22b. A first part of the FIG. 13 logic can be thought of as being the "address selection logic". This portion is represented by circuit elements 135-142 of FIG. 13A. This 135-142 logic controls the address selector 63. When the output of flip-flop 138 is at the zero level, the address selector 63 connects the microprocessor address bus 38 to the address lines 66 running to the high byte and low byte storage units 22a and 22b. The same address, namely, the address appearing at the output of address selector 63 is always supplied to each of these storage units 22a and 22b.

The purpose of the address selection logic 135-142 is to enable alternative addressing of the dual port storage 22a, 22b for host processor DPC (Direct Program Control) and other IDCB transfer operations and for controller initiated interrupt request operations. A second portion of the FIG. 13 logic is represented by circuit elements 143-147 of FIG. 13A. These elements control the "select" and "write" lines running to the storage units 22a and 22b. Its "select" line must be active in order for a storage unit to read in or write out any data.

Figure 14:
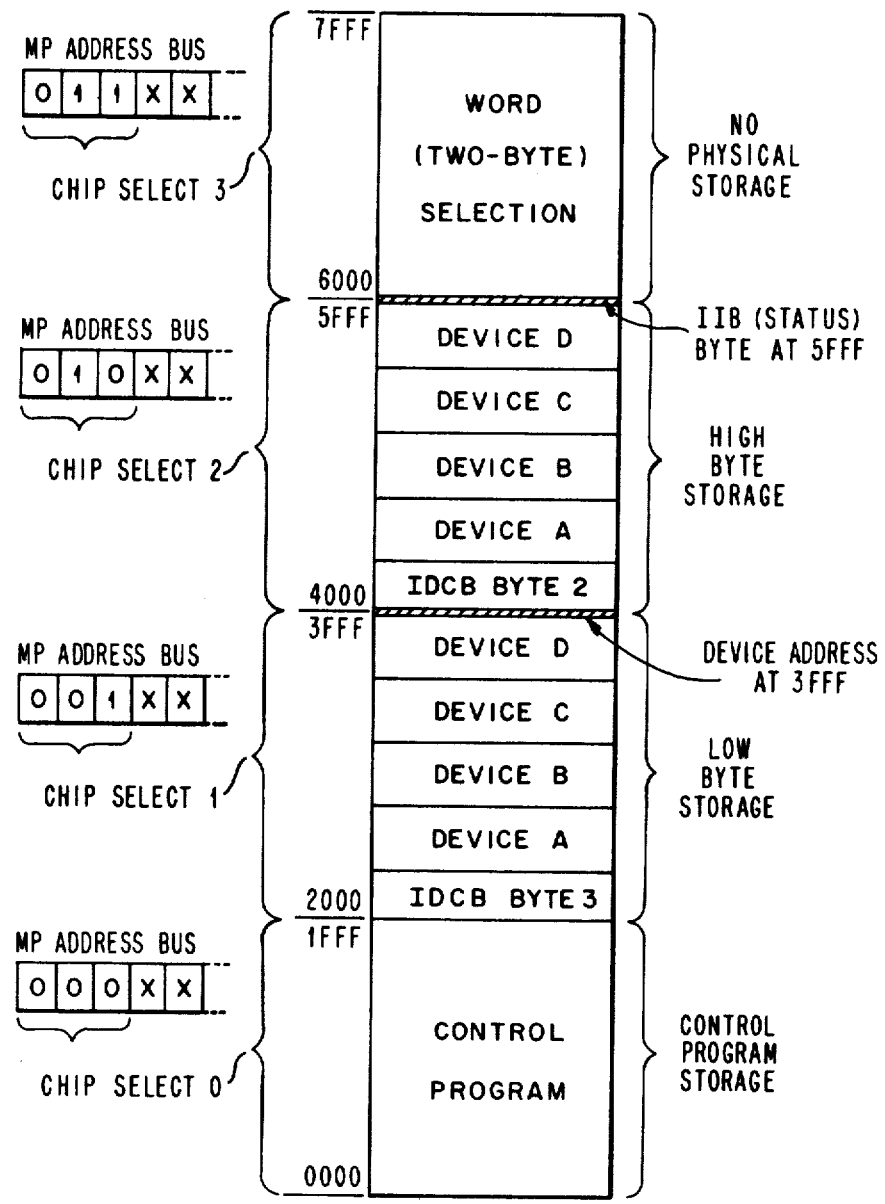
FIG. 14 is a storage address range map of the lower portion of the total address range capable of being addressed by the microprocessor of FIG. 2B.

At this point, it is helpful to consider the memory address range map shown in FIG. 14. This is a map of the lower half (0-32K) of the total address range capable of being addressed by the 16-bit microprocessor address bus 38. As seen from FIG. 14, the second 8K (2000-3FFF in hexadecimal) of the addressing range is used for the low byte storage 22b and the third 8K (4000-5FFF hexadecimal) is used for the high byte storage 22a. As indicated on the left side of FIG. 14, the three highest order bits of the 16-bit microprocessor address bus 38 are used for chip select purposes. These three highest order microprocessor (MP) address bits are not supplied to the address selector 63. They are instead supplied to the chip select decoder 68 which is shown in FIG. 2B and which generates chip select signals CS1, CS2 and CS3, which signals are supplied to the dual port storage unit select logic represented by circuit elements 143-145 in FIG. 13A. Thus, if the address on the microprocessor address bus 38 is in the 2000-3FFF range, the chip select signal CS1 is active via OR gate 143 to select the low byte storage 22b. If the microprocessor bus address is in the 4000-5FFF range, then chip select signal CS2 is active via OR gate 144 to select the high byte storage 22a. If the MP bus address is in the 6000-7FFF range, then the chip select signal CS3 is active via OR gate 145 and both of OR gates 143 and 144 to select both the high byte storage 22a and the low byte storage 22b. This enables the reading or writing of a complete 2-byte data word. Note with respect to FIG. 14 that MP bus addresses in the 6000-7FFF range are used only for chip selection purposes and that there is no separate physical storage provided for this part of the address range.

For cycle steal operations, the storage "write" line is controlled by the MEMW (memory write) signal via OR gate 146. This signal is obtained from the DMA controller 13 via the MP control bus 39. If the storage "write" line is not active, then the occurrence of a storage select signal will enable the storage unit to do a read-out operation. (If "write" is off, the contents of the addressed storage location are placed on the storage data bus by the occurrence of the select signal).

A further thing to note from FIG. 14 is that the 32 lowest byte locations in each of storage 22a and 22b are reserved for and used only for host processor I/O command (IDCB) transfer operations. FIG. 15 is a blow-up or enlargement of the storage maps for these 32 lowest byte locations. The map of FIG. 15 applies to each of the byte wide storage units 22a and 22b.

The significance of what is meant by DPC (Direct Program Control) operations is indicated in FIGS. 3 and 7. Each DPC read command enables a 2-byte word of data or status information to be transferred from the I/O controller 2 to the host processor 1. Each DPC write operation enables a word of data or control information to be transferred from the host processor 1 to the I/O controller 2. As indicated in FIG. 3, the DPC data word (IDCB bits 16-31) is transferred by way of the channel data bus 34. This DPC data word is stored into (or transferred out of) the dual port storage 22a, 22b, with the higher order byte (Byte 2 or bits 16-23) being stored in or read from the high byte storage 22a and the lower order byte (Byte 3 or bits 24-31) being stored in or read from the low byte storage 22b. This type of data transfer is called "DPC" because the transfer of each data word is under the direct control of the host processor program and the host processor must issue a separate I/O command for each word transferred.

When a host processor I/O command is received by and accepted by the I/O controller 2, the output of the flip-flop 138 of FIG. 13A is turned on to activate the "select host" output of the AND gate 141. This switches the address selector 63 so as to connect the indicated host address bus bits to the 5 lowest order output lines of the address selector 63, the remainder of the address selector inputs being grounded as indicated at 148. This causes the data word accompanying the I/O command to be stored into the dual port storage 22a, 22b in the manner indicated in FIG. 15. Thus, if the I/O command is a type 1 write command for device A, the two bytes of the accompanying data word will be stored at the address=5 storage locations in storage units 22a and 22b. Host address bits 14 and 15 define which device it is and, as indicated in FIG. 7, host address bits 1-3 define the operation type.

With reference to FIG. 2A, the acceptance of a host processor I/O command by the I/O controller 2 is signified by the occurrence of an address gate capture signal at the output of the AND gate 54 associated with the address compare circuit 50. With reference to FIG. 13A, this address gate capture signal is supplied via line 24 and OR gate 135 to the AND gate 137. This enables the next occurring ALE pulse from microprocessor 11 or the next occurring address strobe (ADSTB) pulse from the DMA controller 13, whichever is the first to occur, to set the flip-flop 138. This produces the "Allow Host Connect" signal on line 150 which is connected to the output of flip-flop 158. This signal, via AND gate 141, sets the address selector 63 to the "select host" position. The "Allow Host Connect" signal is also supplied to OR gate 145 to cause, via OR gates 143 and 144, the "signal" activation of both storage units 22a and 22b. The "Allow Host Connect" signal is also supplied to AND gate 147 to activate, via OR gate 146, the storage "write" line, provided the I/O command is a "write" type command (host address bit 1=1).

The use of the ALE and ABSTB pulses at OR gate 136 enables the host processor 1, in effect, to cycle steal the I/O command (IDCB) data word into the dual port storage 22a, 22b. In this regard, the dual port storage 22a, 22b is, in actuality, the "main" storage unit for the microprocessor 11 (and the DMA controller 13) and this mechanism enables the I/O command data word to be cycle stole into such "main" storage without interrupting the program which is being executed by the microprocessor 11 (or DMA controller 13). This happens because the output of the flip-flop circuit 138 is also connected by way of a timer 151 and a NOT circuit 152 to the "READY" inputs of both the microprocessor 11 and the DMA controller 13 via line 153 of the microprocessor control bus 39. In particular, when the "Allow Host Connect" signal goes to one, the output of NOT circuit 152 goes to zero, thus removing the Ready signal from the microprocessor and DMA controller. This causes each of the microprocessor 11 and DMA controller 13 to go into a "Wait" state. (Actually, either one or the other but not both of the microprocessor and DMA controller will be active at any given moment and the Ready signal will affect only the active one of these two units.)

This "not ready" condition will prevail for the length of time the flip-flop 138 is in the "set" state plus an additional length of time determined by the timer 151, timer 151 being in the nature of a one shot multivibrator. The flip-flop 138 is reset by the trailing edge of the address gate capture signal via OR gate 139 and NOT circuit 140. The additional time added by the timer 151 is dependent on the particular type of circuit technology that is used for the address selector 61 and the storage units 22a and 22b and in a typical application is selected to be equal to the time duration of approximately two microprocessor clock cycles. This additional time interval is added in order to enable the address selector 63 and its output lines 66 to settle down after the address selector 63 is switched back to the microprocessor address bus 38. When the "Ready" signal reappears at the output of the NOT circuit 152, then the previously operating one of the microprocessor and DMA controller resumes operation from the point at which its operation was suspended.

There is a third kind of sharing or multiplexing of the dual port storage addressing which now needs to be considered. This has to do with I/O controller to host processor interrupt request operations. After the interrupt request from the I/O controller 2 has been recognized by the host processor 1 and after the host processor 1 has established a connection with the I/O controller 2, the host processor 1 sends a service gate signal to the I/O controller 2. During this service gate interval, the host processor 1 takes in the data word appearing on the channel data bus 34 and this data word should be the interrupt ID word shown in FIG. 6. This particular kind of service gate signal is called an interrupt service gate signal because it is sent out in response to an interrupt request (as opposed to a cycle steal request).

Receipt of the interrupt service gate signal by the I/O controller 2 is indicated by the occurrence of the interrupt service gate capture signal on line 130 which comes from the handshaking logic 33 of FIG. 2C. This interrupt service gate (SG) capture signal also enables a setting of the flip-flop circuit 138 by the next occurring one of the ALE and ADSTB pulses. In this case, however, the output of flip-flop circuit 138 operates by way of AND gate 142 to activate the "high impedance output" control line of the address selector 63. This causes the address selector 63 to set each of its outputs to a three state or high impedance condition. This enables the +V voltage source to place all of the address lines 66 running to the storage units 22a and 22b at the binary one level. In other words, this effectively switches the storage address to a value of "1111 ... 11". This addresses the top byte location in each of the storage units 22a and 22b. Referring to FIG. 14, it is seen that the top byte locations contain the data that is needed for the interrupt ID word of FIG. 6. Thus, the proper ID word appears at the output of storage units 22a and 22b for transmission to the host processor 1 during the interrupt service gate interval.

This data (the IIB byte and the device address) were previously loaded into these storage locations by the microprocessor 11 prior to issuance of the interrupt request to the host processor 1.

From the foregoing, it is seen that there are three different ways of addressing the dual port storage 22a, 22b. Furthermore, these three different ways are automatically multiplexed so as not to interfere with one another.

FIG. 13A also shows the logic for operating the two-way drivers 44 and 45. This logic is represented by circuit elements 154–160. Each of two-way drivers 44 and 45 has two control inputs, namely, an output enable (OE) control terminal and a direction (D) control terminal. Activation of the OE input enables the output of the drive so that whatever signal is being supplied to the driver input appears at its output. When OE is inactive or off, the driver outputs are set to a three state or high impedance condition. When the direction control line D is active, it reverses the normal direction for movement of data through the driver. In the present embodiment, the normal direction for drivers 44 and 45 is from left to right. When the direction input D is active, data can pass in the reverse direction, namely, from right to left.

For the two-way driver 45, the output enable line OE3 is activated whenever both of storage units 22a and 22b are simultaneously "selected". This is accomplished by the output of OR gate 145. The direction line D3 is activated to allow data movement from right to left when AND gate 160 supplies a "storage (22a, 22b) to register (data register 46)" signal or when AND gate 157 provides an IDCB read signal, the former being for cycle steal operations and the latter being for I/O command transfer operations.

The output enable line OE1 for the two-way drivers 44 is activated during the occurrence of a cycle steal service gate capture signal on line 32 or the occurrence of an allow host connect signal at the output of flip-flop 138. The direction control line D1 is activated to enable movement of data from right to left through the drivers 44 when either a "register to host" signal is generated by AND circuit 255 or an IDCB read signal is generated by AND gate 157.

Description of FIG. 16 Host DMA Request Logic and Data Register Control

Referring now to FIG. 16, there is shown the details for both the host DMA request logic 28 of FIG. 2B and the data register control logic 47 of FIG. 2A. The data register control logic 47 appears in the lower portion of FIG. 16 and is enclosed by the dash lined box. The upper portion of FIG. 16 is the host DMA request logic 28.

The host DMA request logic 28 controls the DMA controller 13 which in turn controls the transfer of data between the host processor 1 and the dual port storage 22a, 22b in the cycle steal mode. With reference to the DMA controller details shown in FIG. 10, these cycle steal transfer operations are controlled by use of the channel 0 and channel 1 circuits in the DMA controller 13. For the present embodiment, the channel 2 and channel 3 circuits are not used. The channel 0 address counter 82 supplies the host processor main storage addresses which are sent out over the host channel address bus 35 and the channel 1 address counter 84 is used to provide the addresses which are supplied to the dual port storage 22a, 22b for moving the data from the dual port storage to the host processor data bus 34, or vice versa. The associated DMA byte counters 83 and 85 are used to keep track of the number of words remaining to be transferred. When the count in either counter goes to zero, it terminates the operation of the corresponding DMA channel.

Cycle steal operations are initiated by the host processor 1 sending out a start cycle steal command. In response thereto, the microprocessor 11 fetches from the host processor 1 the 8-word device control block (DCB) shown in FIG. 4. These DCB words are fetched in a cycle steal mode and are stored into the appropriate device section of the dual port storage 22a, 22b. Following completion of the DCB transfer, the microprocessor 11 uses the DCB information to initialize the DMA controller 13 for the main data transfer operation. In particular, it loads the DMA address counter 82 with the main storage starting address contained in DCB word 7. The desired starting address for the dual port storage 22a, 22b is loaded into the second DMA address counter 84. This parameter is obtained from one of the instructions in the subroutine contained in control program storage 12 for setting up the DMA controller for the cycle steal purposes for the particular device in question. The first two DMA byte counters 83 and 85 are loaded with the same value, namely, a value equal to one-half of the byte count value contained in word 6 of the DCB. A factor of one-half is used because the byte counters are decremented by a value of one after each data word transfer, whereas the data word transfer constitutes the transfer of two bytes. If the DCB is set up to contain the word count instead of the byte count, then the factor of one-half need not be applied to the value loaded into the DMA byte counters.

A similar word versus byte factor enters into the operation of the DMA address counter 82. The addresses contained in this counter are main storage byte addresses and they are incremented by a value of one after each data transfer. At the same time, the address loaded into the cycle steal address register 27 for each new cycle steal transfer should be two counts higher than the address previously loaded into such register 27 because each cycle steal transfer transfers a two-byte data word. This difference is taken into account by skewing the input lines to the cycle steal address register 27 one bit position to the left so as to effectively produce a left shift of one for the address bits as they are loaded into this register 27.

A pair of control bits contained in each of the DMA byte counters 83 and 85 are also initially loaded so as to tell the DMA controller whether it is to perform a read or write operation. If it is a read operation (controller to host transfer), the control bits in the channel one counter 85 are set so that the DMA controller will produce a MEMR (memory read pulse followed by an IOW (I/O write) pulse during the channel one DMA cycle. Conversely, if it is a write operation (host to controller transfer), then the control bits are loaded so that an IOR pulse followed by a MEMW pulse are generated during the channel one DMA cycle.

One further consideration. The appropriate control bit in the DMA mode register is initially loaded so that the priority resolver 90 will provide a rotating priority mode of operation. In this rotating priority mode, the priority of the different DRQ input lines has a circular sequence. After each DMA cycle, the priority of each DRQ line changes. The DRQ line which has just been serviced will be set to the lowest priority. As a consequence, if, for example, both DRQ 0 and DRQ 1 are turned on and left on, then the rotating priority mechanism will cause DRQ 0 and DRQ 1 to be serviced in an alternate manner, first one, then the other, then the first, etc.

After the initial set-up of the DMA controller 13, the commencement of the primary cycle steal data transfer operations is initiated by the microprocessor 11 and the host DMA request logic 28. In particular, the microprocessor 11 executes an I/O port OUT instruction which gives the data bits on the MP data bus 37 special values and which places an address on the MP address bus 38 such that a chip select CS7 signal is produced by the chip select decoder 68. With reference to FIG. 16, the MP data bit 7 is given the desired value needed to set an I/O port latch 162 to provide the proper input/output indicator value. This data bit value is strobed into latch 162 by the chip select CS7 signal. Latch 162 is set to a one value when input (controller to host) cycle steal operations are not to be performed. If, on the other hand, output (host to controlller) cycle steal operations are to be performed, then latch 162 is loaded with a zero value.

This same microprocessor I/O port OUT instruction also puts the MP data bit 6 line at a value of one. This bit together with the CS7 signal is applied to the AND gate 163 to cause a flip-flop 164 to be placed in the "set" condition. This causes the commencement of the cycle stealing operations. More particularly, the setting of flip-flop 164 turns on the start request line which, in turn, via OR circuit 165 turns on the DRQ 0 request line of the DMA controller 13.

Considering first the case of output or host processor to I/O controller cycle steal operations (IN Latch 162 equal zero), the turning on of the DRQ 0 request line causes the DMA controller 13 to put the host processor main storage address on the MP address bus 38. This address is strobed into the cycle steal address register 27 (FIG. 2A) by the DACK 0 and MEMW pulses produced by the DMA controller 13 for the DRQ 0 DMA cycle. (Note: DACK = DMA Acknowledge.) The one level of the DRQ 0 line also operates via AND gate 166 and OR gate 167 to supply the cycle steal request signal on line 31 which sets the cycle steal request latch 92 (FIG. 12A) which, in turn, sends the cycle steal request in signal to the host processor 1. At this point it should be noted that the start request flip-flop 164 is reset via AND gate 168 by the DACK 0 and ADSTB pulses produced during the DRQ 0 cycle. This occurs late enough in the cycle so that the consequent turning off of the DRQ 0 line has no effect on the completion of the DRQ 0 cycle.

The DMA controller 13 and request logic 28 now sit and wait for the host processor 1 to recognize the cycle steal request and to send out its cycle steal service gate signal, the data word to be transferred also being placed on the host channel data bus 34 by the host processor 1 during this service gate interval. This occurrence is recognized by the DMA request logic 28 by means of the AND gate 169 located in the data register control logic 47. In particular, the occurrence of both the cycle steal service gate (CS/SG) capture signal and the host data strobe signal causes the AND gate 169 to produce a one-level output signal which is called a "host tp data register" transfer signal. This signal is supplied by way of OR circuit 170 and the STB 2 line to strobe the host data bus data into the data register 46 (FIG. 13A). The host to data register transfer signal at the output of AND gate 169 is also supplied by way of OR circuit 171 to set a flip-flop circuit 172. This turns on the DRQ 1 output line of flip-flop 172 to commence the DRQ 1 request to the DMA controller 13.

If the DMA controller 13 has finished the DRQ 0 cycle, then the DRQ 1 request is recognized and the DRQ 1 cycle commenced. Otherwise, the DRQ 1 request is held in abeyance until completion of the DRQ 0 cycle, at which point the DRQ 1 cycle is commenced.

During the DRQ 1 cycle, the DMA controller 13 puts the address for dual port storage 22a, 22b on the MP address bus 38, the 13 lower order bits of this address being passed by the address selector 63 to the dual port storage 22a, 22b. Shortly thereafter, the DACK 1 and MEMW signals from the DMA controller 13 are effective to produce a binary one level at the output of AND gate 173. This binary one level is called a "data register to dual port store" transfer signal and is supplied by way of OR circuit 174 to the OE 2 input of the data register 46 to "enable" the output of the data register 46. This supplies the data word in the register 46 to the two-way drivers 45 (FIG. 13A) and hence to the data bus inputs of the high byte and low byte storage units 22a and 22b. The storage address put out by the DMA controller 13 during this DRQ 1 cycle is of such a value as to cause the production of a CS3 chip select signal by cause the production of a CS3 chip select signal by the chip select decoder 68 (FIG. 2B). As indicated in FIG. 13A, this causes the "select" lines for both OE 2 input of the data register 46 to "enable" the output of the data register 46. This supplies the data word in the register 46 to the two-way drivers cycle, at which point the DRQ 1 cycle is commenced.

The occurrence of the DACK 1 signal during the DRQ 1 cycle is also supplied by way of an AND gate 175 to set a flip-flop 176. The setting of flip-flop 176 turns the DRQ 0 request line back on again. Thus, after completion of the DRQ 1 cycle, another DRQ 0 cycle is commenced and the foregoing DRQ 0/DRQ 1 operations are repeated to cause a cycle steal transfer of the next data word. As mentioned, the DMA address counters 82 and 84 (FIG. 10) are incremented by one and the DMA byte counters 83 and 85 are decremented by one near the ends of their respective DRQ 0 and DRQ 1 cycles. Thus, new host processor and dual port storage addresses are provided for each new DRQ 0/DRQ 1 cycle repetition. These DRQ 0 and DRQ 1 cycles continue to be alternately repeated until the counts in byte counters 83 and 85 (FIG. 10) go to zero. When the count in counter 83 goes to zero, the DMA controller automatically shuts off the channel 0 operations and no more DRQ 0 cycles are performed. Similarly, when the channel one counter 85 goes to zero, channel one operations are terminated and no more DRQ 1 cycles are produced.

The cycle stealing of data in the opposite direction, namely, from the I/O controller 2 to the host processor 1 will now be considered. In this case, the IN latch 162 is set to one. After the set-up of the DMA controller 13, the cycle steal "IN" operations are commenced by the setting of flip-flop 164. This turns on DRQ 0. The binary one level of the DRQ 0 line immediately operates by way of AND gate 177 and OR circuit 171 to set flip-flop 172. This turns on the DRQ 1 request line. The binary one level of the DRQ 1 line is immediately effective by way of AND gate 178 and OR circuit 167 to turn on the cycle steal request line 31 to initiate the cycle steal request to the host processor 1.

Since both the DRQ 0 and DRQ 1 DMA request lines are active, the DMA controller 13 will first perform a DRQ 0 cycle and will immediately follow it with a DRQ 1 cycle. The DRQ 0 cycle is effective to transfer the host processor main storage address from the DMA address counter 82 to the cycle steal address register 27. The DRQ 1 cycle is effective to transfer the next data word from the high byte and low byte storage units 22a and 22b via the two-way drivers 45 to the data register 46. In particular, the occurrence of the DACK 1 and MEMR signals during the DRQ 1 cycle causes an AND gate 179 to produce a one level output. This one level output is called a "dual port store to data register" transfer signal and is supplied by way of OR circuit 170 to the data strobe input STB 2 of the data register 46. This strobes the data word into the data register 46.

The DMA controller 13 and the DMA request logic 28 now sit and wait for the host processor 1 to respond to the cycle steal request. (Actually, the host processor response may already be present at this point in time, in which case no waiting is required.) The response and ready for data transfer condition of the host processor is indicated by the occurrence of the cycle steal service gate (CS/SG) capture signal. This capture signal produces a one-level output at the output of AND gate 180. This one-level output is called a "data register to host processor" transfer signal and is supplied by way of OR circuit 174 to the output enable line OE 2 of the data register 46. This, together with the enabled and right to left transfer condition of the two-way drivers 44, places the data word on the host processor data bus 34 for transmission to the host processor 1.

The occurrence of the cycle steal service gate capture signal, together with the host data strobe from the host processor, cause an AND gate 181 to produce a one level output which in turn causes AND gate 182 to produce a one level output which in turn sets a flip-flop circuit 183. This turns the DRQ 0 request line back on again, such line having been turned off by the resetting of flip-flop 164 by AND gate 168 during the first DRQ 0 cycle. This turning back on of the DRQ 0 line causes a repeating of the above described DRQ 0 and DRQ 1 cycles and, hence, a transfer of the next data word to the host processor 1. These DRQ 0/DRQ 1 cycles continue to be repeated until the counts in DMA byte counters 83 and 85 go to zero, after which DMA operations are terminated and remain terminated until the issuance of a new start cycle steal command and a new device control block (DCB) by the host processor 1.

In the embodiment described up to this point, the DMA controller 13 was only involved in the cycle steal transfer of data words between the host processor 1 and the dual port storage 22a, 22b. In such embodiment, the transfer of data bytes between the I/O device and the dual port storage 22a, 22b is handled by the microprocessor 11. A typical mode of operation would be for the microprocessor 11 to transfer a block or page of data, one byte at a time, from a given I/O device into the corresponding device section of the dual port storage 22a, 22b. After completion of this task, the microprocessors 11 would cause the issuance of an "attention" interrupt request to the host processor 1 to tell it that there was a block of data ready to be transferred to it. Thereafter, the host processor 1 would issue a start cycle steal command to the I/O controller 2. After performing the DCB fetch and the DMA controller set up, the DMA controller 13 would cause the cycle stealing transfer of the block or page of data from the dual port storage 22a, 22b to the host processor 1.

For the case of a typical data transfer in the opposite direction, namely, from the host processor 1 to an I/O device, a similar type of procedure would be applied in reverse, in this case the cycle stealing transfers from the host processor 1 to the dual port storage 22a, 22b occurring before the byte by byte transfer of the data from the dual port storage 22a, 22b to the I/O device.

Figure 17:
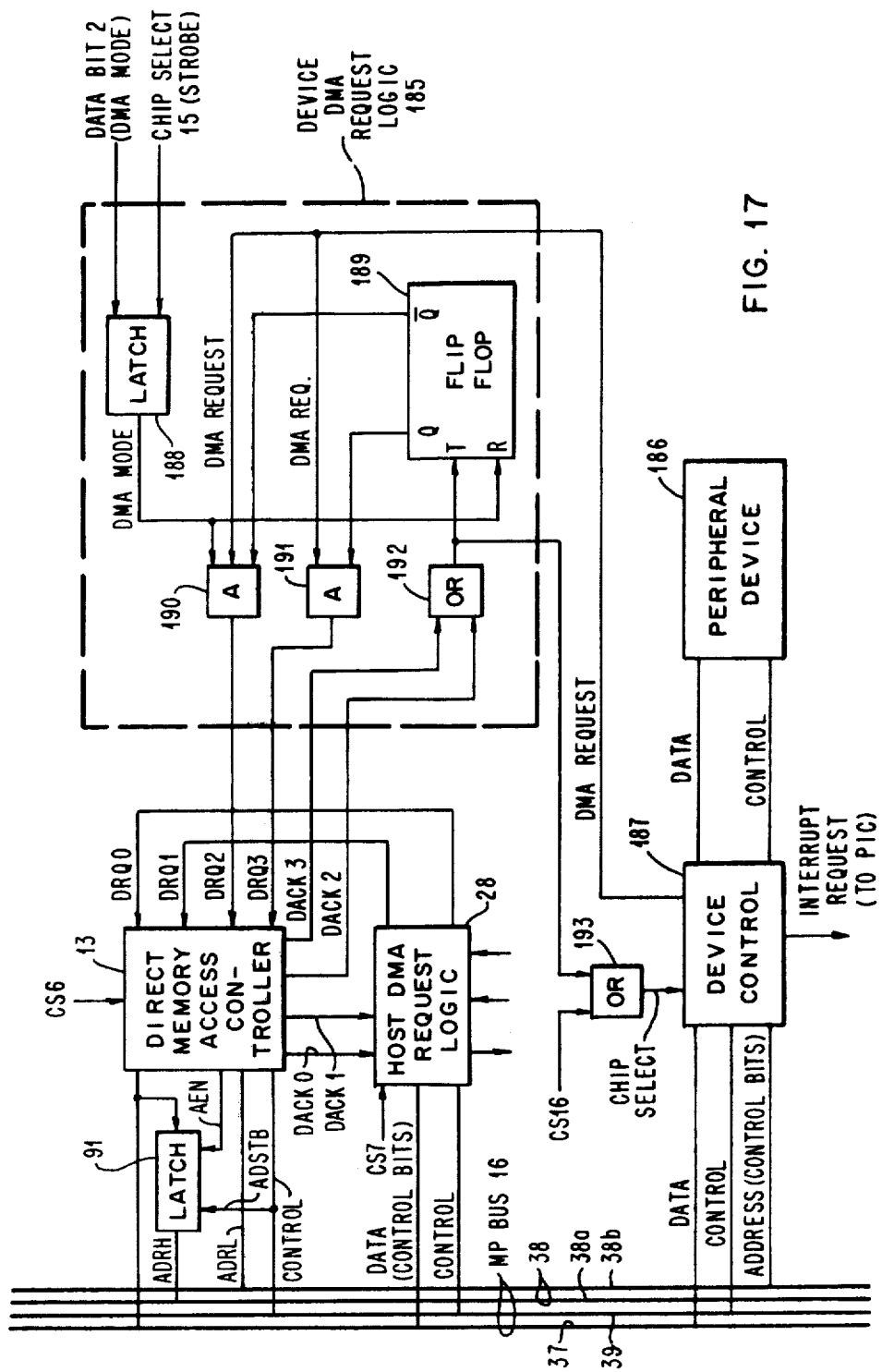
FIG. 17 shows a modification for the FIG. 2 I/O controller whereby the data transfers between one of the I/O units and the controller storage unit are also handled by the plural channel DMA controller of FIG. 2B.

Description of FIG. 17 Device DMA Embodiment

Referring now to FIG. 17, there is shown a modified embodiment whereby the data transfers between the I/O device and the dual port storage 22 are also handled by the DMA controller 13. This embodiment can be used to overlap some of the device to dual port host processor transfers or, conversely to overlap some of the host processor to dual port transfers with some of the dual port to I/O device transfers.

In FIG. 17, the device to dual port transfers (or vice versa) are handled by the DRQ 2 and DRQ 3 channels of the DMA controllers 13. The DRQ 2 channel will be used to handle the transfers to or from the high byte storage 22a and the DRQ 3 channel will be used to handle the transfers to or from the low byte storage 22b. The purpose of the device DMA request logic 185 is to cause successive device DMA requests to be alternately applied to the DRQ 2 and DRQ 3 channels. This is necessary in order to cause successive data bytes to be alternately stored in the high byte storage 22a and the low byte storage 22b.

With reference to the DMA controller details in FIG. 10, the channel 2 address counter 86 is initially loaded with the desired starting address in the high byte storage 22a, this address being in the appropriate address range to produce a CS2 chip select signal. The channel 3 address counter 88, on the other hand, is initially loaded with the appropriate starting address in the low byte storage 22b, this address being in the address range needed to produce a CS1 chip select signal. In order to subsequently get the proper word type transfers, the starting addresses loaded into each of the counters 86 and 88 must be the same, except for the three highest order address bits which are used to do the chip selections. The channel 2 and channel 3 byte counters are initially loaded with the appropriate values corresponding to the number of bytes to be transferred to the corresponding ones of the high byte storage 22a and the low byte storage 22b. As before, the DMA mode register is set so that the priority resolver 90 will operate in the rotating priority mode. As a result, after each DMA cycle, the priority of each channel will be changed with the channel which has just been serviced being set to the lowest priority.

With reference to FIG. 17, when the peripheral device or I/O device 186 is ready for a data byte transfer, the device control unit 187 will raise its DMA request output line. This DMA request line runs to the device DMA request logic 185. The device request logic 185 is initially activated by means of an I/O port latch 188 which is loaded with a binary one value by the microprocessor 11 if it is desired for the data transfers for the peripheral device 186 to be performed in the DMA mode. Alternatively, latch 188 can be loaded with a zero value and the data transfers performed in the manner previously described. The loading of the latch 188 with a one value causes a flip-flop circuit 189 to be reset. This turns on the $\overline{Q}$ output which runs to the AND gate 190 and turns off the Q output which runs to the AND gate 191. This completes the initial set-up of the device request logic 185.

After initialization of the request logic 185, the first DMA request to be issued by the device control unit 187 will be passed by the AND gate 190 to the DRQ 2 input of the DMA controller 13. When the DRQ 2 channel gets its turn, this will cause a byte of data to be transferred from the device control 187 to the high byte storage 22a (or vice versa) via the microcompressor data bus 37. More particularly, the DACK 2 signal produced during the DRQ 2 cycle is supplied by way of OR circuits 192 and 193 to the chip select input of the device control 187 to cause or enable such device control 187 to put its data onto the microprocessor data bus 37. At the same time, the DACK 2 signal appearing at the output of OR circuit 192 is used to toggle the flip-flop 189 to its opposite state, in this case, its "set" state. This turns on the Q output and turns off the $\overline{Q}$ output. As a consequence, the next DMA request issued by the device control 187 is supplied by way of AND circuit 191 to the DRQ 3 input of the DMA controller 13. When this DRQ 3 request gets its turn, the DMA controller 13 will cause the next byte of data to be transferred from the device control 187 to the low byte storage 22b (or vice versa) via the microprocessor data bus 37. The DACK 3 signal produced during the DRQ 3 cycle flips the flip-flop 189 to the opposite state and also enables the chip select input line of the device control 187.

Because of the flipping back and forth of flip-flop 189, successive DMA requests and data byte transfers are alternately handled by the DRQ 2 and DRQ 3 channels of the DMA controller 13.

A typical manner of operation for the FIG. 17 embodiment will now be considered. For sake of example, this will be for the case where data is to be transferred from the I/O device to the host processor. In this example, the microprocessor 11 will initially activate the device request logic 185 but not the host request logic 28. This will cause a DMA transfer of a block or page of data from the I/O device 186 to the dual port storage 22a, 22b. After completion of this block transfer, the microprocessor 11 will activate both the host request logic 28 and the device request logic 185. This will cause a cycle stealing of the first block of data from the dual port storage 22a, 22b to the host processor 1 at the same time as a second block of data is being transferred from the I/O device 186 to the dual port storage 22a, 22b. Because of the rotating priority mode used by the DMA controller 13, the cycle steal transfers to the host processor will, in general, be interleaved with the DMA transfers from the I/O device to the dual port storage.

An advantage of this system is that one set of transfers need not wait on the other set. If, for example, the host processor 1 is busy with other tasks, then the DRQ 0 and DRQ 1 lines will be inactive. Nevertheless, the DRQ 2 and DRQ 3 lines can continue to transfer data from the I/O device 186 to the dual port storage 22a, 22b. Conversely, if for any given interval the I/O device 186 is not ready, then the DRQ 0 and DRQ 1 channels can nevertheless continue to cycle steal data to the host processor 1.

It is not necessary that the DRQ 0/DRQ 1 data transfers be for the same I/O device as are the DRQ 2/DRQ 3 data transfers. If desired, these two sets of transfers can be for two different I/O devices during the same time interval.

Figure 18:
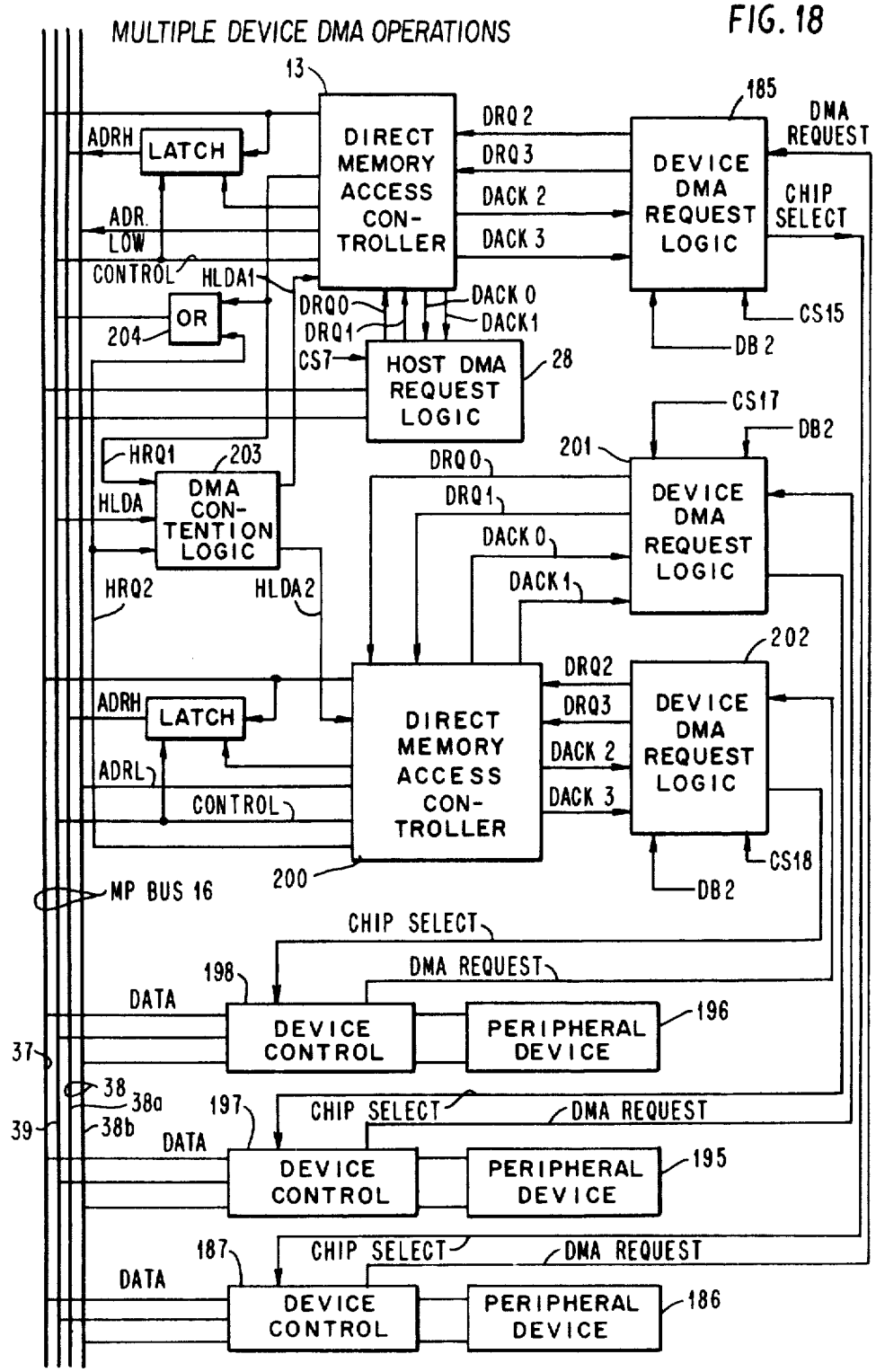

Description of FIG. 18 Multiple Device DMA Embodiment

Referring to FIG. 18, there is shown an embodiment wherein the data transfers to the dual port storage 22a, 22b for three different I/O units are handled by DMA controllers. The I/O device 186 is handled by the DMA controller 13 in the manner previously described in FIG. 17. In addition, two additional I/O devices 195 and 196 and their respective device controls 197 and 198 are handled by a second DMA controller 200. This second DMA controller 200 is of the same construction as the first DMA controller 13 and, as such, is also a 4-channel DMA controller. A second device DMA request logic unit 201 handles the DMA request for the second I/O device 195 and a third device DMA request logic unit 202 handles the DMA requests for the third I/O device 196. Each of these device DMA request logic units 201 and 202 is of the same construction as the device DMA request logic 185 and both operate in the same manner as described above for the device DMA request logic 185.

The operation of the FIG. 18 embodiment is relatively straightforward in view of the previous explanations except for the contention situation which arises when both the DMA controller 13 and the DMA controller 200 present "Hold" request signals (HRQ 1 and HRQ 2, respectively) to the microprocessor 11 at about the same time. This contention situation is resolved by the use of DMA contention logic 203. One possible form of construction for this contention logic 203 is shown in FIG. 19.

Figure 19:
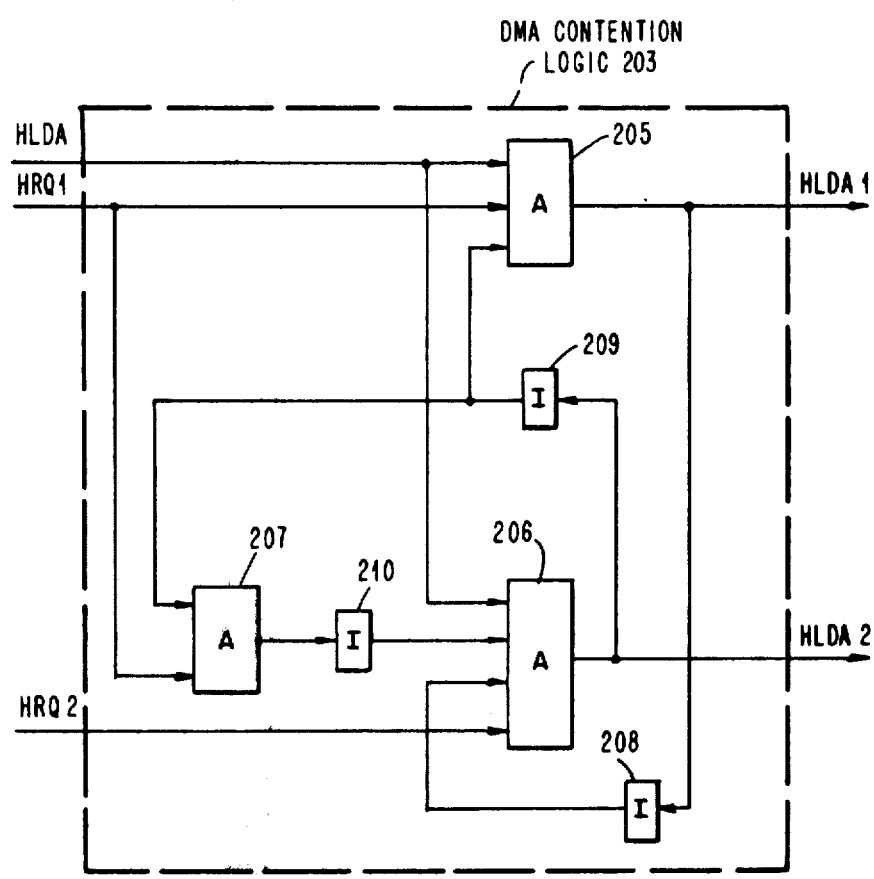
FIG. 19 shows in greater detail the construction of the DMA contention logic of FIG. 18.

Referring to FIG. 19, the HRQ 1 and HRQ 2 signals from the controllers 13 and 200, respectively, are supplied to the correspondingly designated input terminals in FIG. 19. At this point it is noted that, as shown in FIG. 18, these two signals are also connected to the HOLD request line which is part of the microprocessor control bus 39 and which runs to the microprocessor 11, this connection to the HOLD request line being by way of an OR circuit 204. As indicated in FIG. 19, the contention logic 203 receives back from the microprocessor 11 the Hold Acknowledge signal HLDA. The contention logic 203 then decides which of the two DMA controllers 13 and 200 is to get this HLDA signal. The one that gets it is allowed to proceed with its DMA operations, while the one that does not get it must sit and wait for its turn to come up.

The contention logic 203 includes AND circuits 205–207 and NOT circuits 208–210. The logic performed by these circuits is such that if HRQ 1 is at the 1 level and HRQ 2 is at the 0 level when the HLDA signal appears, then the HLDA signal goes to the first DMA controller 13 by way of the HLDA 1 output terminal. Conversely, if HRQ 2 is at the 1 level and HRQ 1 is at the 0 level when the HLDA signal appears, then such signal is sent to the second DMA controller 200 by way of the HLDA 2 output terminal. If, on the other hand, both HRQ 1 and HRQ 2 are at the 1 level when the HLDA signal appears, then this signal is sent to the first DMA controller 13 by way of the HLDA 1 output terminal.

Summary of the Disclosure

There has been described a flexible and versatile high performance input/output (I/O) controller for transferring data between a host processor and one or more I/O units. One feature for improving performance is the provision of an interleaving mechanism for interleaving two different modes of data transfer between the host processor and the I/O controller. One mode is the cycle stealing of data between the I/O controller and the main storage unit of the host processor with such cycle stealing being controlled by the I/O controller. The other mode is an I/O command type of data transfer mode which is under the control of the host processor and wherein for each word of data transferred the host processor supplies an I/O command and an I/O address to the I/O controller.

Another performance improving feature is the provision of a new and improved synchronous cycle stealing mechanism for transferring data to or from a processor storage unit. In the illustrated embodiment, the processor in question is a microprocessor located in the I/O controller for supervising data transfer activities. More particularly, the improved cycle stealing mechanism is used in combination with the interleaving mechanism for enabling the host processor to cycle steal I/O command type data words into or out of a microprocessor storage unit located in the I/O controller in a manner which is transparent to the microprocessor. Thus, the host processor can cycle steal data into or out of the I/O controller at the same time that the I/O controller is busy cycle stealing a different set of data into or out of the host processor main storage unit, these two types of cycle steal transfers being performed in an interleaved manner relative to individual data words.

A further performance improving feature is the provision of a new and improved data interface mechanism for interfacing bit-parallel data buses of different data bit widths. In the illustrated embodiment, this feature provides an automatic and highly efficient mechanism for converting data bytes into data words and vice versa.

The overall organization of the improved I/O controller is such that where several different tasks are to be performed by the controller these tasks are interleaved in a highly compact and efficient manner so as to largely eliminate any undesired idle time on the part of the I/O controller. If, for example, the I/O controller is primarily engaged in cycle stealing data from a first I/O device to the host processor main storage unit, the during any idle moment in the cycle stealing operation, the I/O controller will automatically switch over and start performing some different task like, for example, transferring data from the I/O controller to a second and different I/O device.

The construction of an improved I/O controller is such that, in addition to performing I/O data transfer functions, it can also offload some of the normal programming functions from the host processor. It can, for example, do some of the number crunching for the host processor. It can also offload some of the I/O control program functions previously performed in the host processor. Furthermore, the improved I/O controller can be used to couple later model I/O devices to a host processor having operating system software which was designed for use with earlier model I/O devices. For example, the I/O controller can couple a page mode type keyboard display unit to a host processor having keyboard display software which was written for a character mode type of keyboard display. In this case, the data processing capability of the I/O controller is used to process the character mode I/O commands and control blocks to provide the proper control action for page mode type operations. Thus, obsolescence of host processor programming support is largely eliminated.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. In a data processing system having a processor unit and a random access storage unit associated with and coupled to it and wherein the processor unit provides for each of its machine cycles an address set-up indicative pulse denoting the occurrence of a processor address set-up interval during a portion of each machine cycle, a cycle steal mechanism for transferring data between a separate data handling unit and the processor storage unit without interrupting a program being executed by the processor unit and comprising:

selectively operable signal transfer circuitry for transferring address bits from the data handling unit to the address terminals of the processor storage unit and for providing a data transfer path between the data handling unit and the data terminals of the processor storage unit;

and cycle steal control circuitry responsive to the occurrence of both a transfer request indicative signal from the data handling unit and an address set-up indicative pulse from the processor unit for activating during the processor address set-up interval of the processor machine cycle the selectively operable signal transfer circuitry for enabling the transfer of data from the data handling unit to the processor storage unit or vice versa during a portion of the processor machine cycle when the processor unit itself is not actually moving data to or from the processor storage unit.

2. A cycle steal mechanism in accordance with claim 1 wherein the separate data handling unit is a second processor unit.

3. A cycle steal mechanism in accordance with claim 1 wherein the processor unit is a microprocessor.

4. A cycle steal mechanism in accordance with claim 3 wherein the address set-up indicative pulse is an address latch enable pulse developed by the microprocessor for only a portion of each operating cycle of the microprocessor.

5. A cycle steal mechanism in accordance with claim 4 wherein the separate data handling unit is a second processor unit.

6. A cycle steal mechanism in accordance with claim 1 wherein:

the data processing system further includes a direct memory access controller for accessing the storage unit, for generating for a portion of each of its access cycles an address set-up indicative pulse denoting the occurrence of its address set-up interval and for supplying a hold signal to the processor unit for placing it in a hold state during the storage accessing operation of the direct memory access controller;

and the cycle steal control circuitry is responsive to the occurrence of both a transfer request indicative signal from the data handling unit and an address set-up indicative pulse from either the processor unit or the direct memory access controller for activating the selectively operable signal transfer circuitry during the address set-up interval of either the processor unit or the direct memory access controller.

7. A cycle steal mechanism in accordance with claim 1 wherein:

the minimum access time of the processor storage unit is greater than the processor address set-up interval;

the cycle steal control circuitry includes circuitry for producing an external READY signal and supplying it to the processor unit;

the processor unit also includes circuitry responsive to the absence of the external READY signal for placing the processor unit in a wait state;

the cycle steal control circuitry commences activating the signal transfer circuitry during the processor address set-up interval and continues such activation to provide at least the minimum access time for the processor storage unit;

and the cycle steal control circuitry includes circuitry for removing the external READY signal from the processor unit for the length of time that the signal transfer circuitry is activated.

8. A cycle steal mechanism in accordance with claim 7 wherein:

the data processing system further includes a direct memory access controller for accessing the storage unit, for generating for a portion of each of its access cycles an address set-up indicative pulse denoting the occurrence of its address set-up interval and for supplying a hold signal to the processor unit for placing it in a hold state during the storage accessing operation of the direct memory access controller, such direct memory access controller further including circuitry responsive to the absence of an external READY signal for placing the controller in a wait state;

the cycle steal control circuitry commences activating the signal transfer circuitry during the address set-up interval or either the processor unit or the direct memory access controller;

and the cycle steal control circuitry includes circuitry for removing the external READY signal from both the processor unit and the direct memory access controller for the length of time that the signal transfer circuitry is activated.

9. In a data processing system having a microprocessor and a random access storage unit associated with and coupled to it and wherein the microprocessor provides for only a portion of each of its operating cycles an address set-up indicative pulse denoting the occurrence of a microprocessor address set-up interval, a cycle steal mechanism for transferring data between a second processor and the microprocessor storage unit without interrupting a program being executed by the microprocessor and comprising:

selectively operable signal transfer circuitry for transferring address bits from the second processor to the address terminals of the microprocessor storage unit and for providing a data transfer path between the second processor and the data terminals of the microprocessor storage unit;

address decoder circuitry responsive to the occurrence of predetermined address bits from the second processor for producing an address capture signal;

and cycle steal control circuitry responsive to the occurrence of both an address capture signal from the address decoder circuitry and an address set-up indicative pulse from the microprocessor for activating during the microprocessor address set-up interval of the microprocessor operating cycle the selectively operable signal transfer circuitry for enabling the transfer of data from the second processor to the microprocessor storage unit or vice versa during a portion of the microprocessor operating cycle when the microprocessor itself is not actually moving data to or from the microprocessor storage unit.

* * * * *